United States Patent
Ramanathan et al.

(10) Patent No.: US 11,563,644 B2
(45) Date of Patent: Jan. 24, 2023

(54) METHOD AND APPARATUS FOR MODELING MOBILITY AND DYNAMIC CONNECTIVITY ON A STATIONARY WIRELESS TESTBED

(71) Applicant: goTenna, Inc., Brooklyn, NY (US)

(72) Inventors: Warren Ramanathan, Middlesex, NJ (US); Subramanian Ramanathan, Westford, MA (US)

(73) Assignee: goTenna, Inc., Brooklyn, NY (US)

( * ) Notice: Subject to any disclaimer, the term of this patent is extended or adjusted under 35 U.S.C. 154(b) by 469 days.

(21) Appl. No.: 16/734,158

(22) Filed: Jan. 3, 2020

(65) Prior Publication Data

US 2020/0220788 A1  Jul. 9, 2020

Related U.S. Application Data

(60) Provisional application No. 62/788,447, filed on Jan. 4, 2019.

(51) Int. Cl.
| | |
|---|---|
| *H04L 41/14* | (2022.01) |
| *H04W 24/06* | (2009.01) |
| *H04B 17/391* | (2015.01) |
| *H04W 16/22* | (2009.01) |

(52) U.S. Cl.
CPC ....... *H04L 41/145* (2013.01); *H04B 17/3912* (2015.01); *H04W 16/22* (2013.01); *H04W 24/06* (2013.01)

(58) Field of Classification Search
CPC ... H04L 41/145; H04L 43/50; H04B 17/3912; H04B 17/0085; H04W 16/22; H04W 24/06
See application file for complete search history.

(56) References Cited

U.S. PATENT DOCUMENTS

| | | |
|---|---|---|
| 4,105,958 A | 8/1978 | Pierce et al. |
| 4,464,791 A | 8/1984 | Eness |
| 4,679,248 A | 7/1987 | McKeown |
| 4,737,928 A | 4/1988 | Parl et al. |

(Continued)

OTHER PUBLICATIONS

U.S. Appl. No. 10/003,985, filed Jun. 19, 2018, Holland et al.

(Continued)

*Primary Examiner* — Chae S Lee

(74) *Attorney, Agent, or Firm* — Thrive IP

(57) ABSTRACT

A device, comprising a packet data interface port; a microcontroller, configured to control the packet data interface port, receive a input control signal through the packet data interface port, transmit a status report through the packet data interface port, and in dependence on the input control signal, produce an output control signal; and a radio frequency modification device, configured to modify a received radio frequency signal over a range selectively in dependence on the output control signal. A control processor, communicating through the packet data interface port with the microcontroller, may generate a plurality of the input control signals for a plurality of respective devices comprising the microcontroller and the radio frequency signal control device. The input control signals may be dynamically changed over time to emulate radio frequency conditions resulting from mobility of nodes in a mobile ad hoc radio frequency communication network.

17 Claims, 2 Drawing Sheets

(56) References Cited

U.S. PATENT DOCUMENTS

| | | | |
|---|---|---|---|
| 4,977,607 | A | 12/1990 | Maucksch et al. |
| 5,062,148 | A | 10/1991 | Edwards |
| 5,173,896 | A | 12/1992 | Dariano |
| 5,191,594 | A | 3/1993 | Argo et al. |
| 5,233,628 | A | 8/1993 | Rappaport et al. |
| 5,355,519 | A | 10/1994 | Hasegawa |
| 5,465,393 | A | 11/1995 | Frostrom et al. |
| 5,486,509 | A | 1/1996 | Jimenez et al. |
| 5,579,543 | A | 12/1996 | Crawford et al. |
| 5,794,128 | A | 8/1998 | Brockel et al. |
| 5,862,455 | A | 1/1999 | Martin et al. |
| 5,973,638 | A | 10/1999 | Robbins et al. |
| 6,058,261 | A | 5/2000 | Rapeli |
| 6,061,394 | A | 5/2000 | Itahara |
| 6,091,302 | A | 7/2000 | Arevalo |
| 6,134,514 | A | 10/2000 | Liu et al. |
| 6,236,363 | B1 | 5/2001 | Robbins et al. |
| 6,571,082 | B1 | 5/2003 | Rahman et al. |
| 6,600,926 | B1 | 7/2003 | Widell et al. |
| 6,609,002 | B1 | 8/2003 | Krishnamurthy et al. |
| 6,618,696 | B1 | 9/2003 | Dean et al. |
| 6,665,311 | B2 | 12/2003 | Kondylis et al. |
| 6,724,730 | B1 | 4/2004 | Mlinarsky et al. |
| 6,922,395 | B1 | 7/2005 | Elliott et al. |
| 6,990,075 | B2 | 1/2006 | Krishnamurthy et al. |
| 7,047,176 | B2 | 5/2006 | Klevans et al. |
| 7,231,330 | B2 | 6/2007 | Hernandez-Mondragon et al. |
| 7,310,761 | B2 | 12/2007 | Cho et al. |
| 7,343,094 | B2 | 3/2008 | Kawahata |
| 7,359,966 | B2 | 4/2008 | Saxena et al. |
| 7,376,086 | B1 | 5/2008 | Paraschiv |
| 7,396,875 | B2 | 7/2008 | Lockhart et al. |
| 7,409,217 | B2 | 8/2008 | Jain et al. |
| 7,436,789 | B2 | 10/2008 | Caliskan et al. |
| 7,457,304 | B2 | 11/2008 | Roh et al. |
| 7,460,532 | B2 | 12/2008 | Shin et al. |
| 7,462,435 | B2 | 12/2008 | Hagino |
| 7,469,143 | B2 | 12/2008 | Jain et al. |
| 7,583,587 | B2 | 9/2009 | Qiu et al. |
| 7,590,589 | B2 | 9/2009 | Hoffberg |
| 7,598,766 | B2 | 10/2009 | Mercaldi-Kim et al. |
| 7,606,165 | B2 | 10/2009 | Qiu et al. |
| 7,613,105 | B2 | 11/2009 | Bahl et al. |
| 7,620,368 | B2 | 11/2009 | Wang et al. |
| 7,624,383 | B2 | 11/2009 | Barr et al. |
| 7,626,931 | B2 | 12/2009 | Wu et al. |
| 7,636,309 | B2 | 12/2009 | Alicherry et al. |
| 7,646,754 | B2 | 1/2010 | McLaughlin et al. |
| 7,660,649 | B1 | 2/2010 | Hope et al. |
| 7,672,669 | B2 | 3/2010 | Alexander et al. |
| 7,688,847 | B2 | 3/2010 | Kim et al. |
| 7,698,121 | B2 | 4/2010 | Steenkiste et al. |
| 7,719,988 | B1 | 5/2010 | Ruiz et al. |
| 7,792,138 | B2 | 9/2010 | Hahm et al. |
| 7,819,322 | B2 | 10/2010 | Hammad et al. |
| 7,835,273 | B2 | 11/2010 | Sin |
| 7,860,506 | B2 | 12/2010 | Jain et al. |
| 7,911,962 | B2 | 3/2011 | Khuu et al. |
| 7,912,931 | B2 | 3/2011 | Ahmed et al. |
| 7,961,629 | B2 | 6/2011 | Ueda |
| 8,023,423 | B2 | 9/2011 | Chiang et al. |
| 8,027,273 | B2 | 9/2011 | Nguyen |
| 8,050,409 | B2 | 11/2011 | Agrawal et al. |
| 8,064,377 | B2 | 11/2011 | Yi et al. |
| 8,089,866 | B2 | 1/2012 | Smith et al. |
| 8,107,397 | B1 | 1/2012 | Bagchi et al. |
| 8,115,622 | B2 | 2/2012 | Stolarczyk et al. |
| 8,149,801 | B2 | 4/2012 | Hall |
| 8,169,942 | B2 | 5/2012 | Bahk et al. |
| 8,213,957 | B2 | 7/2012 | Bull et al. |
| 8,218,463 | B2 | 7/2012 | Hall |
| 8,315,231 | B2 | 11/2012 | Pirzada et al. |
| 8,335,207 | B2 | 12/2012 | Singh et al. |
| 8,340,690 | B2 | 12/2012 | Wong et al. |
| 8,355,410 | B2 | 1/2013 | Hall |
| 8,374,352 | B2 | 2/2013 | Song et al. |
| 8,441,959 | B2 | 5/2013 | Erdmann et al. |
| 8,483,616 | B1 | 7/2013 | Hall |
| 8,483,652 | B2 | 7/2013 | Hall |
| 8,493,902 | B2 | 7/2013 | Suri et al. |
| 8,509,078 | B2 | 8/2013 | Moscibroda et al. |
| 8,514,865 | B2 | 8/2013 | Sharma et al. |
| 8,521,092 | B2 | 8/2013 | Kennedy et al. |
| 8,571,214 | B2 | 10/2013 | Lima et al. |
| 8,571,895 | B1 | 10/2013 | Medina, III et al. |
| 8,600,830 | B2 | 12/2013 | Hoffberg |
| 8,630,308 | B2 | 1/2014 | Wang et al. |
| 8,665,890 | B2 | 3/2014 | Yousefi'zadeh et al. |
| 8,671,176 | B1 | 3/2014 | Kharitonov et al. |
| 8,675,678 | B2 | 3/2014 | Farrag et al. |
| 8,682,638 | B2 | 3/2014 | Mlinarsky et al. |
| 8,702,506 | B2 | 4/2014 | Hall |
| 8,705,368 | B1 | 4/2014 | Abts et al. |
| 8,712,056 | B2 | 4/2014 | Hall |
| 8,724,508 | B2 | 5/2014 | Chiang et al. |
| 8,724,530 | B2 | 5/2014 | Ho et al. |
| 8,744,419 | B2 | 6/2014 | Hall et al. |
| 8,751,159 | B2 | 6/2014 | Hall |
| 8,755,281 | B2 | 6/2014 | He et al. |
| 8,777,752 | B2 | 7/2014 | Hall |
| 8,780,693 | B2 | 7/2014 | Kim et al. |
| 8,811,188 | B1 | 8/2014 | Bagchi et al. |
| 8,821,293 | B2 | 9/2014 | Hall |
| 8,824,328 | B2 | 9/2014 | Dhanapal |
| 8,868,027 | B2 | 10/2014 | Hall |
| 8,874,477 | B2 | 10/2014 | Hoffberg |
| 8,874,776 | B2 | 10/2014 | Serban et al. |
| 8,886,506 | B2 | 11/2014 | Conway |
| 8,902,767 | B2 | 12/2014 | Custer et al. |
| 8,908,516 | B2 | 12/2014 | Tzamaloukas et al. |
| 8,935,142 | B2 | 1/2015 | Conway |
| 8,935,533 | B2 | 1/2015 | Kim et al. |
| 8,976,802 | B2 | 3/2015 | Koka et al. |
| 8,996,917 | B1 | 3/2015 | Chandramohan et al. |
| 9,009,089 | B1 | 4/2015 | El Defrawy et al. |
| 9,019,643 | B2 | 4/2015 | Medard et al. |
| 9,025,607 | B2 | 5/2015 | Zeger et al. |
| 9,037,152 | B1 | 5/2015 | Herrera et al. |
| 9,059,927 | B2 | 6/2015 | Aparicio et al. |
| 9,071,451 | B2 | 6/2015 | Hall |
| 9,111,055 | B2 | 8/2015 | Kayton et al. |
| 9,113,371 | B2 | 8/2015 | Sun et al. |
| 9,118,428 | B2 | 8/2015 | Hall |
| 9,137,492 | B2 | 9/2015 | Lima et al. |
| 9,143,274 | B2 | 9/2015 | Zeger et al. |
| 9,158,870 | B2 | 10/2015 | Aparicio et al. |
| 9,160,687 | B2 | 10/2015 | Haeupler et al. |
| 9,161,158 | B2 | 10/2015 | Hall |
| 9,185,529 | B2 | 11/2015 | Medard et al. |
| 9,191,304 | B1 | 11/2015 | Plate et al. |
| 9,210,589 | B2 | 12/2015 | Panta et al. |
| 9,252,982 | B2 | 2/2016 | Jobe et al. |
| 9,253,608 | B2 | 2/2016 | Medard et al. |
| 9,264,863 | B2 | 2/2016 | Hall et al. |
| 9,266,025 | B2 | 2/2016 | Hall |
| 9,271,123 | B2 | 2/2016 | Medard et al. |
| 9,274,912 | B2 | 3/2016 | Conway |
| 9,276,774 | B2 | 3/2016 | Manser |
| 9,294,113 | B2 | 3/2016 | Feizi-Khankandi et al. |
| 9,311,670 | B2 | 4/2016 | Hoffberg |
| 9,319,842 | B2 | 4/2016 | Hall |
| 9,326,163 | B2 | 4/2016 | Monogioudis et al. |
| 9,350,670 | B2 | 5/2016 | Ko et al. |
| 9,361,936 | B2 | 6/2016 | Medard et al. |
| 9,369,255 | B2 | 6/2016 | Medard et al. |
| 9,369,295 | B2 | 6/2016 | Hall |
| 9,369,541 | B2 | 6/2016 | Medard et al. |
| 9,380,351 | B2 | 6/2016 | Zhao et al. |
| 9,391,869 | B2 | 7/2016 | Kharitonov et al. |
| 9,391,871 | B1 | 7/2016 | Abts et al. |
| 9,495,870 | B2 | 11/2016 | Jana et al. |
| 9,521,219 | B2 | 12/2016 | Walker et al. |
| 9,537,759 | B2 | 1/2017 | Calmon et al. |
| 9,544,126 | B2 | 1/2017 | Zeger et al. |

(56) References Cited

U.S. PATENT DOCUMENTS

| | | | |
|---|---|---|---|
| 9,544,922 B2 | 1/2017 | Hall | |
| 9,554,348 B2 | 1/2017 | Niranjayan et al. | |
| 9,559,831 B2 | 1/2017 | Zeger et al. | |
| 9,590,918 B2 | 3/2017 | Lutz et al. | |
| 9,607,003 B2 | 3/2017 | Medard et al. | |
| 9,612,585 B2 | 4/2017 | Aggarwal et al. | |
| 9,656,165 B2 | 5/2017 | Hall | |
| 9,660,745 B2 | 5/2017 | Hall | |
| 9,675,882 B2 | 6/2017 | Hall | |
| 9,680,596 B2 | 6/2017 | Bouda et al. | |
| 9,698,996 B2 | 7/2017 | Hall | |
| 9,713,061 B2 | 7/2017 | Ruiz et al. | |
| 9,768,893 B1 | 9/2017 | Wank et al. | |
| 9,788,329 B2 | 10/2017 | Hall | |
| 9,794,860 B2 | 10/2017 | Hall | |
| 9,800,460 B2 | 10/2017 | Roy et al. | |
| 9,802,120 B2 | 10/2017 | Hall | |
| 9,818,136 B1 | 11/2017 | Hoffberg | |
| 9,825,820 B2 | 11/2017 | Custer et al. | |
| 9,829,870 B2 | 11/2017 | Aggarwal et al. | |
| 9,832,705 B1 | 11/2017 | Newton et al. | |
| 9,877,265 B2 | 1/2018 | Kim et al. | |
| 9,894,559 B2 | 2/2018 | Ko et al. | |
| 9,895,604 B2 | 2/2018 | Hall | |
| 9,906,291 B1 | 2/2018 | Nakamura et al. | |
| 9,923,714 B2 | 3/2018 | Lima et al. | |
| 9,935,724 B1 | 4/2018 | Cooper et al. | |
| 9,936,525 B2 | 4/2018 | Guner | |
| 9,973,881 B2 | 5/2018 | Hall | |
| 9,979,738 B2 | 5/2018 | Holland et al. | |
| 9,985,660 B2 | 5/2018 | Mani et al. | |
| 9,992,048 B2 | 6/2018 | Hu et al. | |
| 9,998,406 B2 | 6/2018 | Haeupler et al. | |
| 2001/0033556 A1 | 10/2001 | Krishnamurthy et al. | |
| 2003/0012176 A1 | 1/2003 | Kondylis et al. | |
| 2003/0088390 A1 | 5/2003 | Jamsa et al. | |
| 2003/0236089 A1 | 12/2003 | Beyme et al. | |
| 2004/0044506 A1 | 3/2004 | Meinila et al. | |
| 2004/0073361 A1 | 4/2004 | Tzamaloukas et al. | |
| 2004/0088148 A1 | 5/2004 | Szymanski et al. | |
| 2004/0088628 A1* | 5/2004 | Poutanen | H04B 17/0087 714/776 |
| 2004/0093421 A1 | 5/2004 | Peng et al. | |
| 2004/0213231 A1 | 10/2004 | Cho et al. | |
| 2005/0004787 A1 | 1/2005 | Kubischta et al. | |
| 2005/0008109 A1 | 1/2005 | Kemppainen et al. | |
| 2005/0053008 A1 | 3/2005 | Griesing et al. | |
| 2005/0055195 A1 | 3/2005 | Hernandez-Mondragon et al. | |
| 2005/0075104 A1 | 4/2005 | Jain et al. | |
| 2005/0078672 A1 | 4/2005 | Caliskan et al. | |
| 2005/0135360 A1 | 6/2005 | Shin et al. | |
| 2005/0169185 A1 | 8/2005 | Qiu et al. | |
| 2005/0169186 A1 | 8/2005 | Qiu et al. | |
| 2005/0180748 A1 | 8/2005 | Kawahata | |
| 2005/0204028 A1 | 9/2005 | Bahl et al. | |
| 2005/0208949 A1 | 9/2005 | Chiueh | |
| 2005/0254472 A1 | 11/2005 | Roh et al. | |
| 2005/0259577 A1 | 11/2005 | Sin | |
| 2005/0283511 A1 | 12/2005 | Fan et al. | |
| 2006/0023887 A1 | 2/2006 | Agrawal et al. | |
| 2006/0034232 A1 | 2/2006 | McLaughlin et al. | |
| 2006/0036426 A1 | 2/2006 | Barr et al. | |
| 2006/0167784 A1 | 7/2006 | Hoffberg | |
| 2006/0199545 A1 | 9/2006 | Abusch-Magder et al. | |
| 2006/0209866 A1 | 9/2006 | Steenkiste et al. | |
| 2006/0215556 A1 | 9/2006 | Wu et al. | |
| 2006/0240835 A1 | 10/2006 | Jain et al. | |
| 2006/0253570 A1 | 11/2006 | Biswas et al. | |
| 2007/0002866 A1 | 1/2007 | Belstner et al. | |
| 2007/0087756 A1 | 4/2007 | Hoffberg | |
| 2007/0153737 A1 | 7/2007 | Singh et al. | |
| 2007/0195798 A1 | 8/2007 | Peng et al. | |
| 2007/0280187 A1 | 12/2007 | Wang et al. | |
| 2008/0046549 A1 | 2/2008 | Saxena et al. | |
| 2008/0056223 A1 | 3/2008 | Manser | |
| 2008/0063106 A1 | 3/2008 | Hahm et al. | |
| 2008/0123586 A1 | 5/2008 | Manser | |
| 2008/0164907 A1 | 7/2008 | Mercaldi-Kim et al. | |
| 2008/0195360 A1 | 8/2008 | Chiang et al. | |
| 2008/0298251 A1 | 12/2008 | Khuu et al. | |
| 2009/0086652 A1 | 4/2009 | Jain et al. | |
| 2009/0140852 A1 | 6/2009 | Stolarczyk et al. | |
| 2009/0190514 A1 | 7/2009 | Yi et al. | |
| 2009/0216510 A1 | 8/2009 | Higashino et al. | |
| 2009/0303888 A1 | 12/2009 | Ariyur et al. | |
| 2010/0074141 A1 | 3/2010 | Nguyen | |
| 2010/0097957 A1 | 4/2010 | Pirzada et al. | |
| 2010/0227607 A1* | 9/2010 | Lorion | H04B 17/0085 455/425 |
| 2010/0232299 A1 | 9/2010 | Conway | |
| 2010/0235285 A1 | 9/2010 | Hoffberg | |
| 2010/0260337 A1 | 10/2010 | Song et al. | |
| 2010/0273504 A1 | 10/2010 | Bull et al. | |
| 2010/0290379 A1 | 11/2010 | Bahk et al. | |
| 2010/0317420 A1 | 12/2010 | Hoffberg | |
| 2011/0004513 A1 | 1/2011 | Hoffberg | |
| 2011/0063999 A1 | 3/2011 | Erdmann et al. | |
| 2011/0090795 A1 | 4/2011 | Li et al. | |
| 2011/0310733 A1 | 12/2011 | Tzamaloukas et al. | |
| 2012/0002567 A1 | 1/2012 | Sun et al. | |
| 2012/0020216 A1 | 1/2012 | Vashist et al. | |
| 2012/0039231 A1 | 2/2012 | Suri et al. | |
| 2012/0059921 A1 | 3/2012 | Serban et al. | |
| 2012/0155522 A1 | 6/2012 | Custer et al. | |
| 2012/0182867 A1 | 7/2012 | Farrag et al. | |
| 2012/0250529 A1 | 10/2012 | Lee et al. | |
| 2012/0250575 A1 | 10/2012 | Chiang et al. | |
| 2012/0253772 A1 | 10/2012 | Conway | |
| 2012/0258727 A1 | 10/2012 | Wong et al. | |
| 2012/0264377 A1* | 10/2012 | Seelenfreund | H04W 24/06 455/67.11 |
| 2012/0294152 A1 | 11/2012 | Yousefi'zadeh et al. | |
| 2013/0060552 A1 | 3/2013 | Aparicio et al. | |
| 2013/0060553 A1 | 3/2013 | Patel et al. | |
| 2013/0060554 A1 | 3/2013 | Aparicio et al. | |
| 2013/0099941 A1 | 4/2013 | Jana et al. | |
| 2013/0107760 A1 | 5/2013 | Ho et al. | |
| 2013/0148501 A1 | 6/2013 | He et al. | |
| 2013/0159724 A1 | 6/2013 | Kim et al. | |
| 2013/0282263 A1 | 10/2013 | Tee | |
| 2013/0322426 A1 | 12/2013 | Niranjayan et al. | |
| 2014/0172393 A1 | 6/2014 | Kang et al. | |
| 2014/0269355 A1 | 9/2014 | Monogioudis et al. | |
| 2014/0269751 A1 | 9/2014 | Koka et al. | |
| 2014/0307614 A1 | 10/2014 | Ruiz et al. | |
| 2014/0343915 A1 | 11/2014 | Song | |
| 2015/0078291 A1 | 3/2015 | Guner | |
| 2015/0085691 A1 | 3/2015 | Custer et al. | |
| 2015/0207834 A1 | 7/2015 | Zhao et al. | |
| 2015/0304222 A1 | 10/2015 | Ko et al. | |
| 2015/0331771 A1 | 11/2015 | Conway | |
| 2016/0021599 A1 | 1/2016 | Fitzek et al. | |
| 2016/0105252 A1 | 4/2016 | Bouda et al. | |
| 2016/0212655 A1 | 7/2016 | Ko et al. | |
| 2016/0320759 A1 | 11/2016 | Macha et al. | |
| 2017/0061790 A1 | 3/2017 | Jana et al. | |
| 2017/0103103 A1 | 4/2017 | Nixon et al. | |
| 2017/0105265 A1 | 4/2017 | Sadwick | |
| 2017/0164266 A1 | 6/2017 | Domaratsky | |
| 2017/0207974 A1 | 7/2017 | Shailendra et al. | |
| 2017/0215021 A1 | 7/2017 | de Azevedo et al. | |
| 2017/0223037 A1 | 8/2017 | Singh et al. | |
| 2017/0277522 A1 | 9/2017 | Conway | |
| 2017/0339769 A1 | 11/2017 | Wennemyr et al. | |
| 2018/0068358 A1 | 3/2018 | Hoffberg | |
| 2018/0091989 A1 | 3/2018 | Baroudi et al. | |
| 2018/0093291 A1 | 4/2018 | Benjamin | |
| 2018/0151008 A1 | 5/2018 | Dehnert et al. | |
| 2018/0212671 A1 | 7/2018 | Wu et al. | |
| 2018/0246801 A1 | 8/2018 | Krauss | |
| 2018/0259473 A1* | 9/2018 | Mohseni | G01N 27/026 |
| 2018/0262388 A1 | 9/2018 | Johnson et al. | |
| 2018/0262597 A1 | 9/2018 | Matthieu et al. | |
| 2018/0279146 A1 | 9/2018 | Baroudi et al. | |

(56) References Cited

U.S. PATENT DOCUMENTS

2018/0284743 A1  10/2018  Cella et al.
2018/0295531 A1  10/2018  Baroudi et al.
2018/0302836 A1  10/2018  Fitzek et al.
2018/0324609 A1  11/2018  Diancin

OTHER PUBLICATIONS

U.S. Appl. No. 10/004,082, filed Jun. 19, 2018, Bane et al.
U.S. Appl. No. 10/009,259, filed Jun. 26, 2018, Calmon et al.
U.S. Appl. No. 10/009,783, filed Jun. 26, 2018, Baroudi et al.
U.S. Appl. No. 10/016,684, filed Jul. 10, 2018, Hall.
U.S. Appl. No. 10/028,198, filed Jul. 17, 2018, Fitzek et al.
U.S. Appl. No. 10/075,893, filed Sep. 11, 2018, Hall et al.
U.S. Appl. No. 10/091,218, filed Oct. 2, 2018, Holland et al.
U.S. Appl. No. 10/116,418, filed Oct. 30, 2018, Wu et al.
U.S. Appl. No. 10/117,111, filed Oct. 30, 2018, Jobe et al.

* cited by examiner

METHOD AND APPARATUS FOR MODELING MOBILITY AND DYNAMIC CONNECTIVITY ON A STATIONARY WIRELESS TESTBED

CROSS REFERENCE TO RELATED APPLICATIONS

The present application is a non-provisional of, and claims benefit of priority under 35 U.S.C. § 119(e) from U.S. Provisional Patent Application No. 62/788,447, filed Jan. 4, 2019, the entirety of which is expressly incorporated herein by reference.

FIELD OF THE INVENTION

The present invention relates to the field of RF test equipment, and more particularly to automated mobility simulators for testing wireless ad hoc networks.

BACKGROUND OF THE INVENTION

Each reference cited herein is expressly incorporated herein by reference in its entirety. U.S. Pat. No. 7,698,121 (Steenkiste, et al.) relates to a device and method for programmable wideband network emulation. The system emulated a wireless network having a programmable controller for emulating the movements of a plurality of RF nodes. A plurality of signal generation and conversion cards are interposed between a programmable logic core and the RF nodes. The signal generation and conversion cards are responsive to the control signals.

A wireless radio frequency communication network is subject to errors, interference, and limitations of the radio transmitter and receiver. Often, these are analog radio frequency domain issues, and cannot be digitally simulated absent complete characterization, and that characterization is difficult to obtain, or is part of the reason for the analysis. In some cases, testing involves interaction of the RF nodes, and characterization if their interaction is difficult or unavailable based on the known properties of a single RF node. Therefore, a physical network simulation may be used to test the actual hardware for its intended use, in an environment that emulates the environment through analog modifications of the radio signals emitted and/or received by the RF nodes.

Wireless simulators are confronted with the difficult task of recreating the operation of a system at all layers of the network protocol stack as well as the interaction of the system in the physical environment. To make the problem tractable, simplifications are typically made throughout the implementation of the simulator. Even fundamental tasks such as deciding what a received frame looks like diverge greatly from the operation of real hardware. See Takai et al. "Effects of Wireless Physical Layer Modeling in Mobile Ad Hoc Networks", Proc. of MobiHoc 2001, October 2001.

Efforts have been made to develop RF emulators that accurately emulate down to the physical layer. RAMON uses three programmable attenuators to allow emulation of the signals between a single mobile node and two base stations. E. Hernandez and S. Helal. "RAMON: Rapid mobility network emulator". Proc. of the 27th IEEE Conference on Local Computer Networks (LCN'02), November 2002.

See, U.S. Pat. Nos. 10,003,985; 10,004,082; 10,009,259; 10,009,783; 10,016,684; 10,028,198; 10,075,893; 10,091,218; 10,116,418; 10,117,111; 4,105,958; 4,464,791; 4,679,248; 4,737,928; 4,977,607; 5,062,148; 5,173,896; 5,191,594; 5,233,628; 5,355,519; 5,465,393; 5,794,128; 5,862,455; 5,973,638; 6,058,261; 6,061,394; 6,134,514; 6,236,363; 6,571,082; 6,600,926; 6,609,002; 6,618,696; 6,665,311; 6,724,730; 6,922,395; 6,990,075; 7,047,176; 7,231,330; 7,310,761; 7,343,094; 7,359,966; 7,376,086; 7,409,217; 7,436,789; 7,457,304; 7,460,532; 7469,143; 7,583,587; 7,590,589; 7,598,766; 7,606,165; 7,613,105; 7,620,368; 7,624,383; 7,626,931; 7,636,309; 7,646,754; 7,660,649; 7,688,847; 7,698,121; 7,719,988; 7,792,138; 7,835,273; 7,860,506; 7,911,962; 7,912,931; 7,961,629; 8,023,423; 8,027,273; 8,050,409; 8,064,377; 8,089,866; 8,107,397; 8,115,622; 8,149,801; 8,169,942; 8,213,957; 8,218,463; 8,315,231; 8,335,207; 8,340,690; 8,355,410; 8,374,352; 8,441,959; 8,483,616; 8,483,652; 8,493,902; 8,509,078; 8,514,865; 8,571,214; 8,571,895; 8,600,830; 8,630,308; 8,665,890; 8,671,176; 8,675,678; 8,682,638; 8,702,506; 8,705,368; 8,712,056; 8,724,508; 8,724,530; 8,744,419; 8,751,159; 8,755,281; 8,777,752; 8,780,693; 8,811,188; 8,821,293; 8,824,328; 8,868,027; 8,874,477; 8,874,776; 8,886,506; 8,902,767; 8,908,516; 8,935,142; 8,935,533; 8,976,802; 8,996,917; 9,009,089; 9,019,643; 9,025,607; 9,037,152; 9,059,927; 9,071,451; 9,111,055; 9,113,371; 9,118,428; 9,137,492; 9,143,274; 9,158,870; 9,160,687; 9,161,158; 9,185,529; 9,191,304; 9,210,589; 9,252,982; 9,253,608; 9,264,863; 9,266,025; 9,271,123; 9,274,912; 9,276,774; 9,294,113; 9,311,670; 9,319,842; 9,326,163; 9,350,670; 9,361,936; 9,369,255; 9,369,295; 9,369,541; 9,380,351; 9,391,869; 9,391,871; 9,495,870; 9,537,759; 9,544,126; 9,544,922; 9,554,348; 9,559,831; 9,590,918; 9,607,003; 9,656,165; 9,660,745; 9,675,882; 9,680,596; 9,698,996; 9,713,061; 9,768,893; 9,788,329; 9,794,860; 9,800,460; 9,802,120; 9,818,136; 9,825,820; 9,832,705; 9,877,265; 9894,559; 9,895,604; 9,906,291; 9,923,714; 9,935,724; 9,936,525; 9,973,881; 9,979,738; 9,985,660; 9,992,048; and 9,998,406; and U.S. Pub. Patent App. Nos. 20010033556; 20030012176; 20030088390; 20030236089; 20040044506; 20040073361; 20040088148; 20040088628; 20040093421; 20040213231; 20050004787; 20050008109; 20050053008; 20050055195; 20050075104; 20050078672; 20050135360; 20050169185; 20050169186; 20050180748; 20050204028; 20050208949; 20050254472; 20050259577; 20050283511; 20060023887; 20060034232; 20060036426; 20060167784; 20060199545; 20060209866; 20060215556; 20060240835; 20060253570; 20070002866; 20070087756; 20070153737; 20070195798; 20070280187; 20080046549; 20080056223; 20080063106; 20080123586; 20080164907; 20080195360; 20080298251; 20090086652; 20090140852; 20090190514; 20090216510; 20090303888; 20100074141; 20100097957; 20100232299; 20100235285; 20100260337; 20100273504; 20100290379; 20100317420; 20110004513; 20110063999; 20110090795; 20110310733; 20120002567; 20120020216; 20120039231; 20120059921; 20120155522; 20120182867; 20120250529; 20120250575; 20120253772; 20120258727; 20120294152; 20130060552; 20130060553; 20130060554; 20130099941; 20130107760; 20130148501; 20130159724; 20130282263; 20130322426; 20140172393; 20140269355; 20140269751; 20140307614; 20140343915; 20150078291; 20150085691; 20150207834; 20150304222; 20150331771; 20160021599; 20160105252; 20160212655; 20170061790; 20170164266; 20170207974; 20170215021; 20170277522; 20180068358; 20180091989; 20180212671; 20180279146; 20180295531; 20180302836; and 20180324609.

Bouckaert, Stefan, Wim Vandenberghe, Bart Jooris, Ingrid Moerman, and Piet Demeester. "The w-iLab. t testbed." In International Conference on Testbeds and Research Infrastructures, pp. 145-154. Springer, Berlin, Heidelberg, 2010.

Brown, Timothy X., Sheetalkumar Doshi, Sushant Jadhav, Daniel Henkel, and Roshan-George Thekkekunnel. "A full scale wireless ad hoc network test bed." In Proc. of International Symposium on Advanced Radio Technologies, Boulder, Colo., vol. 10. 2005.

Buscemi, Scott, and Steven Boyd. "A Comparative Analysis of Lab-Based Network Emulation with Field Results for Large-Scale MANETs." In Military Communications Conference (MILCOM), 2014 IEEE, pp. 1305-1310. IEEE, 2014.

Carreras, Iacopo, Roberto Grasso, Csaba Kiraly, Sandro Pera, Hagen Woesner, Yabin Ye, and Csaba A. Szabo. "Design considerations on the CREATE-NET testbed." In Testbeds and Research Infrastructures for the Development of Networks and Communities, 2005. Tridentcom 2005. First International Conference on, pp. 44-53. IEEE, 2005.

Cavin, David, Yoav Sasson, and André Schiper. "On the accuracy of MANET simulators." In Proceedings of the second ACM international workshop on Principles of mobile computing, pp. 38-43. ACM, 2002.

Cheng, B-N., Shivkumar Kalyanaraman, and M. Klien. "A geography-aware scalable community wireless network test bed." In Testbeds and Research Infrastructures for the Development of Networks and Communities, 2005. Tridentcom 2005. First International Conference on, pp. 82-91. IEEE, 2005.

Choudhury, Romit Roy, Xue Yang, Ram Ramanathan, and Nitin H. Vaidya. "Using directional antennas for medium access control in ad hoc networks." In Proceedings of the 8th annual international conference on Mobile computing and networking, pp. 59-70. ACM, 2002.

Choudhury, Romit Roy, Xue Yang, Ram Ramanathan, and Nitin H. Vaidya. "On designing MAC protocols for wireless networks using directional antennas." IEEE transactions on mobile computing 5, no. 5 (2006): 477-491.

Cutitta, Roger P., Charles R. Dietlein, Arthur Harrison, and Russell Harris. US Army Research Laboratory and University of Notre Dame Distributed Sensing: Hardware Overview. No. ARL-TR-8199. US Army Research Laboratory Adelphi United States, 2017.

De, Pradipta, Ashish Raniwala, Srikant Sharma, and Tzicker Chiueh. "MINT: A miniaturized network testbed for mobile wireless research." In INFOCOM 2005. 24th Annual Joint Conference of the IEEE Computer and Communications Societies. Proceedings IEEE, vol. 4, pp. 2731-2742. IEEE, 2005.

Engel, Michael, Matthew Smith, Sven Hanemann, and Bernd Freisleben. "Wireless ad-hoc network emulation using microkernel-based virtual linux systems." In Proceedings of the 5th EUROSIM Congress on Modeling and Simulation, pp. 198-203. 2004.

Fall, K., Network Emulation in the Vint/NS Simulator, Proc. of The Fourth IEEE Symposium on Computers and Communications, July 1999

Ferdous, Raihana, Syed Foysol Islam, AHM Saiful Islam, and Sakeeb Adnan Sagor. "Efficient testing environment for wireless networking experiments." In Internet, 2009. AH-ICI 2009. First Asian Himalayas International Conference on, pp. 1-6. IEEE, 2009.

Flynn, Juan, Hitesh Tewari, and Donal O'Mahony. "JEmu: A real time emulation system for mobile ad hoc networks." In Proceedings of the First Joint IEI/IEE Symposium on Telecommunications Systems Research. 2001.

Gray, Robert S., David Kotz, Calvin Newport, Nikita Dubrovsky, Aaron Fiske, Jason Liu, Christopher Masone, Susan McGrath, and Yougu Yuan. "Outdoor experimental comparison of four ad hoc routing algorithms." In Proceedings of the 7th ACM international symposium on Modeling, analysis and simulation of wireless and mobile systems, pp. 220-229. ACM, 2004.

Green, David B., and Ranga Reddy. "A system for calibrating and validating military ad-hoc network models." In Military Communications Conference, 2005. MILCOM 2005. IEEE, pp. 2538-2543. IEEE, 2005.

Ground, Proving. "Large-Scale High-Fidelity Mobile Ad-hoc Network Emulation." In Users' Group Conference, p. 427.

Hernandez, E. and S. Helal, "RAMON: Rapid-Mobility Network Emulator", Proc. of 27th IEEE Conference on Local Computer Networks (LCN'02), November 2002

Hernandez, Edwin, and Abdelsalam Helal. "RAMON: Rapid-mobility network emulator." In Local Computer Networks, 2002. Proceedings. LCN 2002. 27th Annual IEEE Conference on, pp. 809-817. IEEE, 2002.

Herrscher, Daniel, Steffen Maier, and Kurt Rothermel. "Distributed emulation of shared media networks." SIMULATION SERIES 35, no. 4 (2003): 226-233.

Hortelano, Jorge, Cano Juan-Carlos, Calafate Carlos T, and Manzoni Pietro. "Testing applications in manet environments through emulation." EURASIP Journal on Wireless Communications and Networking 2009 (2010).

Imran, Muhammad, Abas Md Said, and Halabi Hasbullah. "A survey of simulators, emulators and testbeds for wireless sensor networks." In Information Technology (ITSim), 2010 International Symposium in, vol. 2, pp. 897-902. IEEE, 2010.

Jiang, Weirong, and Chao Zhang. "A portable real-time emulator for testing multi-radio manets." In Parallel and Distributed Processing Symposium, 2006. IPDPS 2006. 20th International, pp. 7-pp. IEEE, 2006.

Johnson, David, and A. A. Lysko. "Overview of the Meraka wireless grid test bed for evaluation of ad-hoc routing protocols." (2007).

Johnson, David, and Albert Lysko. "Comparison of MANET routing protocols using a scaled indoor wireless grid." Mobile Networks and Applications 13, no. 1-2 (2008): 82-96.

Johnson, David, Tim Stack, Russ Fish, Dan Flickinger, Rob Ricci, and Jay Lepreau. "TrueMobile: A mobile robotic wireless and sensor network testbed." In The 25th Annual Joint Conference of the IEEE Computer and Communications Societies. IEEE Computer Society. 2006.

Judd, Glenn, and Peter Steenkiste. "Repeatable and realistic wireless experimentation through physical emulation." ACM SIGCOMM Computer Communication Review 34, no. 1 (2004): 63-68.

Kaba, James T., and Douglas R. Raichle. "Testbed on a desktop: strategies and techniques to support multi-hop manet routing protocol development." In Proceedings of the 2nd ACM international symposium on Mobile ad hoc networking & computing, pp. 164-172. ACM, 2001.

Karygiannis, A., and Emmanouil Antonakakis "mLab: a mobile ad hoc network test bed." In 1st Workshop on Security, Privacy and Trust in Pervasive and Ubiquitous Computing in conjunction with the IEEE International Conference in Pervasive Services. 2005.

Kasera, Kamal K., and Ram Ramanathan. "A location management protocol for hierarchically organized multi-hop mobile wireless networks." In Universal Personal Communications Record, 1997. Conference Record., 1997 IEEE 6th International Conference on, pp. 158-162. IEEE, 1997.

Kaszuba, Anna, Radoslaw Checinski, Michal Kryk, Jerzy Lopatka, and Leszek Nowosielski. "Electromagnetically shielded real-time MANET testbed." In Progress In Electromagnetics Research Symposium, PIERS 2014 Conference Proceedings, Guanzhou, China, pp. 2706-2710. 2014.

Kheirallah, H. N., et al., "M-Profile Ray Tracing Technique for Multipath Propagation", January 1987, Electronics Letters, vol. 23, No. 2, pp. 82-83.

Kiess, Wolfgang, and Martin Mauve. "A survey on real-world implementations of mobile ad-hoc networks." Ad Hoc Networks 5, no. 3 (2007): 324-339.

Kimmo Kuusilinna et al., "Describing MIMO Designs for Rapid Prototyping in the BEE Environment", September 2004, European Signal Processing Conference 2004, pp. 693-696.

Kotz, David, Calvin Newport, Robert S. Gray, Jason Liu, Yougu Yuan, and Chip Elliott. "Experimental evaluation of wireless simulation assumptions." In Proceedings of the 7th ACM international symposium on Modeling, analysis and simulation of wireless and mobile systems, pp. 78-82. ACM, 2004.

Krishnan, Rajesh, Prithwish Basu, Joanne M. Mikkelson, Christopher Small, Ram Ramanathan, Daniel W. Brown, John R. Burgess et al. "The spindle disruption-tolerant networking system." In Military Communications Conference, 2007. MILCOM 2007. IEEE, pp. 1-7. IEEE, 2007.

Kropff, Matthias, Tronje Krop, Matthias Hollick, Parag S. Mogre, and Ralf Steinmetz. "A survey on real world and emulation testbeds for mobile ad hoc networks." In Testbeds and Research Infrastructures for the Development of Networks and Communities, 2006. TRIDENTCOM 2006. 2nd International Conference on, pp. 6-pp. IEEE, 2006.

Kryk, Michal, and Jerzy Lopatka. "Radio environment simulation using RF switch matrix for MANET tests." In Signal Processing and Communication Systems (ICSPCS), 2014 8th International Conference on, pp. 1-7. IEEE, 2014.

Kryk, Michal, and Jerzy Lopatka. "The concept of radio channel emulator for MANET tests." In XI Conference on Reconnaissance and Electronic Warfare Systems, vol. 10418, p. 104180J. International Society for Optics and Photonics, 2017.

Kulla, Elis. "Implementation of a Testbed and a Simulation System for MANETs: Experiments and Simulations.

Lee, Tsung-Han, Alan Marshall, Bosheng Zhou, and Jiakang Liu. "Designing and building a wireless adaptation architecture ad-hoc network test-bed." (2004): 542-547.

Lin, T., S. Midkiff, and J. Park, A Dynamic Topology Switch for the Emulation of Wireless Mobile Ad Hoc Networks, Proc. of the 27th Annual IEEE Conference on Local Computing Networks (LCN'02), November 2002

Liu, Weiguo, and Hantao Song. "Research and implementation of mobile ad hoc network emulation system." In Distributed Computing Systems Workshops, 2002. Proceedings. 22nd International Conference on, pp. 749-754. IEEE, 2002.

Lloyd, Errol L., Rui Liu, Madhav V. Marathe, Ram Ramanathan, and Sekharipuram S. Ravi. "Algorithmic aspects of topology control problems for ad hoc networks." Mobile Networks and applications 10, no. 1-2 (2005): 19-34.

Lysko, Albert A., and David L. Johnson. "A study of propagation effects in a wireless test bed." WSEAS Transactions on Communications 7, no. 8 (2008): 857-871.

Macker, Joseph P., William Chao, and Jeffrey W. Weston. "A low-cost, IP-based mobile network emulator (MNE)." In Military Communications Conference, 2003. MILCOM'03. 2003 IEEE, vol. 1, pp. 481-486. IEEE, 2003.

Mahadevan, P., K. Yocum, and A. Vandat, Emulating Large-Scale Wireless Networks Using Modelnet, Poster and Abstract Mobicom 2002, September 2002

Mahadevan, Priya, Adolfo Rodriguez, David Becker, and Amin Vandat. "MobiNet: a scalable emulation infrastructure for ad hoc and wireless networks." ACM SIGMOBILE Mobile Computing and Communications Review 10, no. 2 (2006): 26-37.

Maltz, David A., Josh Broch, and David B. Johnson. "Lessons from a full-scale multihop wireless ad hoc network testbed." Personal Communications, IEEE 8, no. 1 (2001): 8-15.

Matthes, Michael, Holger Biehl, Michael Lauer, and Oswald Drobnik. "MASSIVE: An emulation environment for mobile ad-hoc networks." In Wireless On-demand Network Systems and Services, 2005. WONS 2005. Second Annual Conference on, pp. 54-59. IEEE, 2005.

Matthieu, Roy, and Marc-Olivier Killijian. "Brief announcement: a platform for experimenting with mobile algorithms in a laboratory." In Proceedings of the 28th ACM symposium on Principles of distributed computing, pp. 316-317. ACM, 2009.

Midkiff, Scott F., Luiz A. DaSilva, George C. Hadjichristofi, Tao Lin, and Jahng Park. "Emulating Dynamic Topologies for Repeatable Experiments with Mobile Ad Hoc Networks." In Testbeds and Research Infrastructure for the Development of Networks and Communities, 2007. TridentCom 2007. 3rd International Conference on, pp. 1-9. IEEE, 2007.

Noble, B., M. Satyanarayanan, G. Nguyen, and R. Katz, Trace-Based Mobile Network Emulation, Proc. of SIGCOMM 1997, September 1997

Nordstrom, Erik, Per Gunningberg, and Henrik Lundgren. "A testbed and methodology for experimental evaluation of wireless mobile ad hoc networks." In Testbeds and Research Infrastructures for the Development of Networks and Communities, 2005. Tridentcom 2005. First International Conference on, pp. 100-109. IEEE, 2005.

Papenfuss. Jeff R., et al., "A TMS320C6701/FPGA Based Frequency Selective RF Channel Simulator Using IF Sampling", August 2000, Texas Instruments DSPS Fest, pp. 1-6.

Patel, Kishan N. "A survey on emulation testbeds for mobile ad-hoc networks." Procedia Computer Science 45 (2015): 581-591.

Priya Mahadevan et al., "Emulating Large-Scale Wireless Networks using ModelNet", September 2002, MOBICOM'02, pp. 1-2.

PROPSim, Propsim C8 Wideband Multi-Channel Simulator, www.propsim.net/, 2008

Punnoose, P., P. Nikitin, J. Broch, and D. Stancil, "Optimizing Wireless Network Protocols Using Real-Time Predictive Propagation Modeling", Proc. of the Radio and Wireless Conference (RAWCON) 1999, August 1999

Puzar. M. and T. Plagemann, "NEMAN: A Network Emulator for Mobile Ad-Hoc Networks," in Proceedings of 8th International Conference on Telecommunications, 15 Jun. 2005.

Ramanathan, Ram, and Jason Redi. "A brief overview of ad hoc networks: challenges and directions." IEEE communications Magazine 40, no. 5 (2002): 20-22.

Ramanathan, Ram, and Martha Steenstrup. "Hierarchically-organized, multihop mobile wireless networks for quality-of-service support." Mobile networks and applications 3, no. 1 (1998): 101-119.

Ramanathan, Ram, and Regina Hain. "An ad hoc wireless testbed for scalable, adaptive QoS support." In Wireless Communications and Networking Confernce, 2000. WCNC. 2000 IEEE, vol. 3, pp. 998-1002. IEEE, 2000.

Ramanathan, Ram, and Regina Rosales-Hain. "Topology control of multihop wireless networks using transmit power adjustment." In Proceedings IEEE INFOCOM 2000. Conference on Computer Communications. Nineteenth Annual Joint Conference of the IEEE Computer and Communications Societies, pp. 404-413. IEEE, 2000.

Ramanathan, Ram, Jason Redi, Cesar Santivanez, David Wiggins, and Stephen Polit. "Ad hoc networking with directional antennas: a complete system solution." IEEE Journal on selected areas in communications 23, no. 3 (2005): 496-506.

Ramanathan, Ram, Richard Hansen, Prithwish Basu, Regina Rosales-Hain, and Rajesh Krishnan. "Prioritized epidemic routing for opportunistic networks." In Proceedings of the 1st international MobiSys workshop on Mobile opportunistic networking, pp. 62-66. ACM, 2007.

Ramanathan, Ram. "Challenges: a radically new architecture for next generation mobile ad hoc networks." In Proceedings of the 11th annual international conference on Mobile computing and networking, pp. 132-139. ACM, 2005.

Ramanathan, Ram. "On the performance of ad hoc networks with beamforming antennas." In Proceedings of the 2nd ACM international symposium on Mobile ad hoc networking & computing, pp. 95-105. ACM, 2001.

Raychaudhuri, D., I. Seskar, M. Ott, S. Ganu, K. Ramachandran, H. Kremo, R. Siracusa, H. Liu, and M. Singh, Overview of the Orbit Radio Grid Testbed for Evaluation of Next-Generation Wireless Network Protocols, Proc. of WCNC 2005, New Orleans, La., March 2005

Raychaudhuri, Dipankar, Ivan Seskar, Max Ott, Sachin Ganu, Kishore Ramachandran, Haris Kremo, Robert Siracusa, Hang Liu, and Manpreet Singh. "Overview of the ORBIT radio grid testbed for evaluation of next-generation wireless network protocols." In Wireless Communications and Networking Conference, 2005 IEEE, vol. 3, pp. 1664-1669. IEEE, 2005.

Redi, Jason, and Ram Ramanathan. "The DARPA WNaN network architecture." In Military Communications Conference, 2011-milcom 2011, pp. 2258-2263. IEEE, 2011.

Redi, Jason, Steve Kolek, Keith Manning, Craig Partridge, Regina Rosales-Hain, Ram Ramanathan, and Isidro Castineyra. "JAVeLEN—an ultra-low energy ad hoc wireless network." Ad Hoc Networks 6, no. 1 (2008): 108-126.

Ritter, Hartmut, Min Tian, Thiemo Voigt, and Jochen Schiller. "A highly flexible testbed for studies of ad-hoc network behaviour." In Local Computer Networks, 2003. LCN'03. Proceedings. 28th Annual IEEE International Conference on, pp. 746-752. IEEE, 2003.

Sanghani, Sagar, Timothy X. Brown, Shweta Bhandare, and Sheetalkumar Doshi. "EWANT: The emulated wireless ad hoc network testbed." In Wireless Communications and Networking, 2003. WCNC 2003. 2003 IEEE, vol. 3, pp. 1844-1849. IEEE, 2003.

Santivanez, Cesar A., Bruce McDonald, Ioannis Stavrakakis, and Ram Ramanathan. "On the scalability of ad hoc routing protocols." In INFOCOM 2002. Twenty-First Annual Joint Conference of the IEEE Computer and Communications Societies. Proceedings. IEEE, vol. 3, pp. 1688-1697. IEEE, 2002.

Santiváñez, Cesar A., Ram Ramanathan, and Ioannis Stavrakakis "Making link-state routing scale for ad hoc networks." In Proceedings of the 2nd ACM international symposium on Mobile ad hoc networking & computing, pp. 22-32. ACM, 2001.

Spirent Communications, TAS4500 Flex5 RF Channel Emulator, www.spirent-communications.com/, 2008

Sprient Communications, SR5500 Wireless Channel Emulator, December 2007

Sterbenz, James P G, Rajesh Krishnan, Regina Rosales Hain, Alden W. Jackson, David Levin, Ram Ramanathan, and John Zao. "Survivable mobile wireless networks: issues, challenges, and research directions." In Proceedings of the 1st ACM workshop on Wireless security, pp. 31-40. ACM, 2002.

Takai, M., et al., Scalable Testbed for Next-Generation Wireless Networking Technologies, Proc. First Int'l Conf. of TRIDENT, 2005.

Tandon, Nitin, Bhupendra Suman, Nisha Agarwal, and Vikas Bhatia. "Design and testability aspects of mobile adhoc networking waveform physical layer for software defined radio." In Computing, Communication and Automation (ICCCA), 2017 International Conference on, pp. 453-457. IEEE, 2017.

Taylor, Keith Richard. "Using commercial ray tracing software to drive an attenuator-based mobile wireless testbed." PhD diss., 2012.

Varshney, M., Z. Xu, S. Mohan, Y. Yang, D. Xu, R. Bagrodia, WHYNET: A Framework for In-Situ Evaluation of Heterogeneous Mobile Wireless Systems, WiNTECH September 2007

Vossen, Wannes, Alvaro Tones, Jorge Hortelano, Carlos T. Calafate, Juan-Carlos Cano, and Pietro Manzoni. "Extending an emulation platform for automatized and distributed evaluation of QoS in MANETs." (2010).

Walker, Brenton, Ian D. Vo, Matthew Beecher, and Charles Clancy. "A demonstration of the meshtest wireless testbed." In Testbeds and Research Infrastructures for the Development of Networks & Communities and Workshops, 2009. TridentCom 2009. 5th International Conference on, pp. 1-1. IEEE, 2009.

White, B., J. Lepreau, and S. Guruprasad, Lowering the Barrier to Wireless and Mobile Experimentation, Proc. of HotNets-I, October 2002 www.cc.gatech.edu, Dynamic Network Emulation Backplane Project, Parallel and Distributed Simulation, Georgia tech.

Yao, Kang, Weiqing Sun, Mansoor Alam, Mingzhe Xu, and Vijay Devabhaktuni. "A Real-Time Testbed for Routing Network." In Testbeds and Research Infrastructure. Development of Networks and Communities, pp. 256-270. Springer Berlin Heidelberg, 2012.

Zhang, Yongguang, and Wei Li. "An integrated environment for testing mobile ad-hoc networks." In Proceedings of the 3rd ACM international symposium on Mobile ad hoc networking & computing, pp. 104-111. ACM, 2002.

Zheng, Pei, and Lionel M. Ni. "Empower: A network emulator for wireline and wireless networks." In INFOCOM 2003. Twenty-Second Annual Joint Conference of the IEEE Computer and Communications. IEEE Societies, vol. 3, pp. 1933-1942. IEEE, 2003.

Zhou, J., Z. Ji, M. Varshney, Z. Xu, Y. Yang, M. Marina, R. Bagrodia, Whynet: A Hybrid Testbed for Large-Scale, Heterogeneous and Adaptive Wireless Networks, WiN-TECH September 2006

See also, U.S. Pat. Nos. 7,672,669, 8,874,776, 8,027,273, 8,521,092, 9,829,870, 9,612,585, and 9,521,219, and U.S. Pub. App. Nos. 20180262388, 20180262597, 20180284743, 20160320759, 20170103103, 20170105265, 20170223037, 20180151008, 20180093291, 20170339769.

The Internet of things (IoT) is the network of physical devices, vehicles, home appliances, and other items embedded with electronics, software, sensors, actuators, and connectivity which enables these things to connect, collect and exchange data. Communications with nodes may be wired (e.g., Ethernet, serial protocols) or wireless, according to one or more of:

Short-Range Wireless

Bluetooth mesh networking—Specification providing a mesh networking variant to Bluetooth low energy (BLE) with increased number of nodes and standardized application layer (Models).

Light-Fidelity (Li-Fi)—Wireless communication technology similar to the Wi-Fi standard, but using visible light communication for increased bandwidth.

Near-field communication (NFC)—Communication protocols enabling two electronic devices to communicate within a 4 cm range.

QR codes and barcodes—Machine-readable optical tags that store information about the item to which they are attached.

Radio-frequency identification (RFID)—Technology using electromagnetic fields to read data stored in tags embedded in other items.

Transport Layer Security—Network security protocol.

Wi-Fi—technology for local area networking based on the IEEE 802.11 standard, where devices may communicate through a shared access point or directly between individual devices.

ZigBee—Communication protocols for personal area networking based on the IEEE 802.15.4 standard, providing low power consumption, low data rate, low cost, and high throughput.

Medium-Range Wireless

LTE-Advanced—High-speed communication specification for mobile networks. Provides enhancements to the LTE standard with extended coverage, higher throughput, and lower latency.

Long-Range Wireless

Low-power wide-area networking (LPWAN)—Wireless networks designed to allow long-range communication at a low data rate, reducing power and cost for transmission. Available LPWAN technologies and protocols: LoRaWan, Sigfox, NB-IoT, Weightless.

Very small aperture terminal (VSAT)—Satellite communication technology using small dish antennas for narrowband and broadband data.

Wired

Ethernet—General purpose networking standard using twisted pair and fiber optic links in conjunction with hubs or switches.

Power-line communication (PLC)—Communication technology using electrical wiring to carry power and data. Specifications such as HomePlug or G.hn utilize PLC for networking IoT devices.

U.S. 20180246801 discloses various embodiments for controlling a system under test (herein "SUT"), using a cognitive control based test runner by one or more processors, are provided. In one embodiment, by way of example only, a method for controlling an application being tested using cognitive analysis in a virtual computing environment, again by a processor, is provided. Current state data representing a current state of an application may be collected during a test run in a testing environment, such that the current state data is cognitively analyzed in relation to one or more known states. One or more control inputs may be determined for guiding the application to a target state based on the analysis. The testing environment may be a virtualized computing environment that may employ machine learning and may also be part of an Internet of Things (IoT) network.

See, en.wikipedia.org/wiki/Internet_of_things

"Can we talk? Internet of Things vendors face a communications 'mess'". Computerworld. 2014 Apr. 18.

"Disruptive Technologies Global Trends 2025". National Intelligence Council (NIC). April 2008. p. 27.

"FTC Report on Internet of Things Urges Companies to Adopt Best Practices to Address Consumer Privacy and Security Risks". Federal Trade Commission. 27 Jan. 2015.

"How IoT & smart home automation will change the way we live". Business Insider.

"How IoT's are Changing the Fundamentals of "Retailing"". Trak.in—Indian Business of Tech, Mobile & Startups. 30 Aug. 2016.

"Industrial Internet Insights Report". Accenture.

"Internet of Things (IoT)". gatewaytechnolabs.com.

"Internet of Things Done Wrong Stifles Innovation". InformationWeek. 7 Jul. 2014.

"Internet of Things Global Standards Initiative". ITU.

"IOT Brings Fragmentation in Platform". arm.com.

"IoT Terms Database". IoT One.

"Key Applications of the Smart IoT to Transform Transportation".

"OGC Sensor Web Enablement: Overview And High Level Architecture". OGC.

"OGC SensorThings API standard specification". OGC.

"Panopticon as a metaphor for the internet of things". The Council of the Internet of Things.

"Quick Guide". IoT ONE.

"Smarter Things: The Autonomous IoT". GDR Blog. GDR Creative Intelligence. 5 Jan. 2018.

"STE Security Innovation Awards Honorable Mention: The End of the Disconnect". securityinfowatch.com.

"Taming the IoT terminology zoo: what does it all mean?". Information Age. Vitesse Media Plc. 2015 Jul. 30.

"Technology Working Group". The Industrial Internet Consortium.

"The "anti-patterns" that turned the IoT into the Internet of Shit/Boing Boing". boingboing.net.

"The Enterprise Internet of Things Market". Business Insider. 25 Feb. 2015.

"The Internet of Things (IoT): Revolutionized The Way We Live!". Postscapes. 2017-08-10.

"The Internet of Things: a jumbled mess or a jumbled mess?". The Register.

"The 'Internet of Things': Legal Challenges in an Ultra-Connected World". Mason Hayes & Curran. 22 Jan. 2016.

"The Question of Who Owns the Data Is About to Get a Lot Trickier". Fortune. 6 Apr. 2016.

"The Societal Impact of the Internet of Things". British Computer Society. 14 Feb. 2013.

"Western Singapore becomes test-bed for smart city solutions". Coconuts Singapore. 2014 Jun. 19.

Aburukba, Raafat; Al-Ali, A. R.; Kandil, Nourhan; AbuDamis, Diala (10 May 2016). Configurable ZigBee-based control system for people with multiple disabilities in smart homes. IEEE. pp. 1-5. doi:10.1109/ICCSII.2016.7462435. ISBN 978-1-4673-8743-9.

Acharjya, D. P.; Ahmed, N. S. S. (2017). "Recognizing Attacks in Wireless Sensor Network in View of Internet of Things". In Acharjya, D. P.; Geetha, M. K. Internet of Things: Novel Advances and Envisioned Applications. Springer. pp. 149-50. ISBN 9783319534725.

Acharjya, D. P.; Geetha, M. K., ed. (2017). Internet of Things: Novel Advances and Envisioned Applications. Springer. p. 311. ISBN 9783319534725.

Ackerman, Spencer (15 Mar. 2012). "CIA Chief: We'll Spy on You Through Your Dishwasher". Wired.

Aleisa, Noura; Renaud, Karen; Jayawardena, Srimal (2016). "Privacy of the Internet of Things: A Systematic Literature Review (Extended Discussion)". arXiv:1611.03340 [cs.CY].

Ali, Junade (2 May 2017). "IoT Security Anti-Patterns". Cloudflare Blog.

Alippi, C. (2014). Intelligence for Embedded Systems. Springer Verlag. ISBN 978-3-319-05278-6.

Alleven, Monica. "Sigfox launches IoT network in 10 UK cities". Fierce Wireless Tech.

Amazon's Alexa

Amiot, Emmanuel. "The Internet of Things. Disrupting Traditional Business Models". Oliver Wyman.

Anthony, Scott (2016 Jul. 15). "Disruptive Innovation: Kodak's Downfall Wasn't About Technology". Harvard Business Review. Harvard Business Publishing.

Antonakakis, Manos; April, Tim; Bailey, Michael; Bernhard, Matt; Bursztein, Elie; Cochran, Jaime; Durumeric, Zakir; Halderman, J. Alex; Invernizzi, Luca (Aug. 18, 2017). Understanding the Mirai Botnet. Usenix. ISBN 978-1-931971-40-9.

Apple's HomeKit

Ardiri, Aaron (8 Jul. 2014). "Will fragmentation of standards only hinder the true potential of the IoT industry?". evothings.com.

Ashton, K. (22 Jun. 2009). "That 'Internet of Things' Thing".

Basenese, Louis (2015 Dec. 21). "The Best Play on the Internet of Things Trend". Wall Street Daily. Wall Street Daily.

Bauer, Harald; Patel, Mark; Veira, Jan (October 2015). "Internet of Things: Opportunities and challenges for semiconductor companies". McKinsey & Co.

Brown, Eric (13 Sep. 2016). "Who Needs the Internet of Things?". Linux.com.

Brown, Eric (20 Sep. 2016). "21 Open Source Projects for IoT". Linux.com.

Brown, Ian (12 Feb. 2013). "Britain's Smart Meter Programme: A Case Study in Privacy by Design". International Review of Law, Computers & Technology. 28 (2): 172-184. doi:10.1080/13600869.2013.801580. SSRN 2215646.

Brown, Ian (2015). "Regulation and the Internet of Things". Oxford Internet Institute.

Cardwell, Diane (18 Feb. 2014). "At Newark Airport, the Lights Are On, and They're Watching You". The New York Times.

Chui, Michael; Löffler, Markus; Roberts, Roger. "The Internet of Things". McKinsey Quarterly. McKinsey & Company.

Clearfield, Chris. "Why The FTC Can't Regulate The Internet Of Things". Forbes.

Clearfield, Christopher (26 Jun. 2013). "Rethinking Security for the Internet of Things". Harvard Business Review Blog.

Commission of the European Communities (18 Jun. 2009). "Internet of Things—An action plan for Europe". COM (2009) 278 final.

Crump, Catherine; Harwood, Matthew (25 Mar. 2014). "The Net Closes Around Us". TomDispatch.

da Costa, C A; Pasluosta, C F; Eskofier, B; da Silva, D B; da Rosa Righi, R (July 2018). "Internet of Health Things: Toward intelligent vital signs monitoring in hospital wards". Artificial Intelligence in Medicine. 89: 61-69. doi:10.1016/j.artmed.2018.05.005. PMID 29871778.

Daugherty, Paul; Negm, Walid; Banerjee, Prith; Alter, Allan. "Driving Unconventional Growth through the Industrial Internet of Things". Accenture.

Davies, Nicola. "How the Internet of Things will enable 'smart buildings'". Extreme Tech.

de Sousa, M. (2015). "Chapter 10: Integrating with Muzzley". Internet of Things with Intel Galileo. Packt Publishing. p. 163. ISBN 9781782174912.

Delicato, F. C.; Al-Anbuky, A.; Wang, K., ed. (2018). Smart Cyber-Physical Systems: towards Pervasive Intelligence systems. Future Generation Computer Systems. Elsevier.

Demiris, G; Hensel, K (2008). "Technologies for an Aging Society: A Systematic Review of 'Smart Home' Applications". "IMIA Yearbook of Medical Informatics 2008": 33-40.

Dey, Nilanjan; Hassanien, Aboul Ella; Bhatt, Chintan; Ashour, Amira S.; Satapathy, Suresh Chandra (2018). Internet of things and big data analytics toward next-generation intelligence. Springer International Publishing. ISBN 978-3-319-60434-3.

Engineer, A; Sternberg, E M; Najafi, B (21 Aug. 2018). "Designing Interiors to Mitigate Physical and Cognitive Deficits Related to Aging and to Promote Longevity in Older Adults: A Review". Gerontology. 64 (6): 1-11. doi:10.1159/000491488. PMID 30130764.

Ersue, M.; Romascanu, D.; Schoenwaelder, J.; Sehgal, A. (4 Jul. 2014). "Management of Networks with Constrained Devices: Use Cases". IETF Internet Draft.

Evans, Dave (April 2011). "The Internet of Things: How the Next Evolution of the Internet Is Changing Everything". CISCO White Paper.

Feamster, Nick (18 Feb. 2017). "Mitigating the Increasing Risks of an Insecure Internet of Things". Freedom to Tinker.

Fielding, Roy Thomas (2000). "Architectural Styles and the Design of Network-based Software Architectures". University Of California, Irvine.

Finley, Klint (6 May 2014). "The Internet of Things Could Drown Our Environment in Gadgets". Wired.

Fitchard, Kevin (2014 May 20). "Sigfox brings its internet of things network to San Francisco". Gigaom.

Främling, Kary, Holmström, Jan, Ala-Risku, Timo, Kärkkainen, Mikko. Product agents for handling information about physical objects. Report of Laboratory of Information Processing Science series B, TKO-B 153/03, Helsinki University of Technology, 2003. 20 p.

Främling, Kary. Tracking of material flow by an Internet-based product data management system (in Finnish: Tavaravirran seuranta osana Internet-pohjaista tuotetiedon hallintaa). Tieke EDISTY magazine, No. 1, 2002, Publication of Tieke (Finnish Information Society Development Centre), Finland, 2002. pp. 24-25.

Franceschi-Bicchierai, Lorenzo (2015-07-29). "Goodbye, Android". Motherboard. Vice.

Gassée, J.-L. (12 Jan. 2014). "Internet of Things: The "Basket of Remotes" Problem". Monday Note.

Gatouillat, Arthur; Badr, Youakim; Massot, Bertrand; Sejdic, Ervin (2018). "Internet of Medical Things: A Review of Recent Contributions Dealing with Cyber-Physical Systems in Medicine". IEEE Internet of Things Journal: 1. doi:10.1109/jiot.2018.2849014. ISSN 2327-4662.

Gautier, Philippe; Gonzalez, Laurent (2011). L'Internet des Objets . . . Internet, mais en mieux. Foreword by Gérald Santucci (European commission), postword by Daniel Kaplan (FING) and Michel Volle. Paris: AFNOR editions. ISBN 978-2-12-465316-4.

Gilbert, Arlo (3 Apr. 2016). "The time that Tony Fadell sold me a container of hummus".

Greenberg, Andy (21 Jul. 2015). "Hackers Remotely Kill a Jeep on the Highway—With Me in It". Wired.

Greengard, Samuel (2015). The Internet of Things. Cambridge, Mass.: MIT Press. p. 90. ISBN 9780262527736.

Gubbi, Jayavardhana; Buyya, Rajkumar; Marusic, Slaven; Palaniswami, Marimuthu (24 Feb. 2013). "Internet of Things (IoT): A vision, architectural elements, and future directions". Future Generation Computer Systems. 29 (7): 1645-1660. arXiv:1207.0203. doi:10.1016/j.future.2013.01.010.

Gubbi, Jayavardhana; Buyya, Rajkumar; Marusic, Slaven; Palaniswami, Marimuthu (1 Sep. 2013). "Internet of Things (IoT): A vision, architectural elements, and future directions". Future Generation Computer Systems. Including Special sections: Cyber-enabled Distributed Computing for Ubiquitous Cloud and Network Services & Cloud Computing and Scientific Applications—Big Data, Scalable Analytics, and Beyond. 29 (7): 1645-1660. arXiv:1207.0203. doi:10.1016/j.future.2013.01.010.

Haase, J.; Alahmad, M.; Nishi, H.; Ploennigs, J.; Tsang, K. F. (1 Jul. 2016). "The IOT mediated built environment: A brief survey". 2016 IEEE 14th International Conference on Industrial Informatics (INDIN): 1065-1068. doi: 10.1109/INDIAN.2016.7819322 (inactive 2018 Nov. 7).

Hardy, Quentin (4 Feb. 2015). "Tim O'Reilly Explains the Internet of Things". The New York Times Bits. The New York Times.

Hart, Jane K.; Martinez, Kirk (1 May 2015). "Toward an environmental Internet of Things". Earth & Space Science. 2 (5): 194-200. Bibcode:2015E&SS . . . 2 . . . 194H. doi:10.1002/2014EA000044.

Hassan, Q. F. (2018). Internet of Things A to Z: Technologies and Applications. John Wiley & Sons. pp. 27-8. ISBN 9781119456759.

Hassan, Q. F. (2018). Internet of Things A to Z: Technologies and Applications. John Wiley & Sons. pp. 41-4. ISBN 9781119456759.

Hassan, Q. F.; Khan, A. ur R.; Madani, S. A. (2017). Internet of Things: Challenges, Advances, and Applications. CRC Press. pp. 41-2. ISBN 9781498778534.

Hendricks, Drew. "The Trouble with the Internet of Things". London Datastore. Greater London Authority.

Howard, Philip N. (1 Jun. 2015). "The Internet of Things is Posed to Change Democracy Itself". Politico.

Howard, Philip N. (2015). Pax Technica: How the Internet of things May Set Us Free, Or Lock Us Up. New Haven, Conn.: Yale University Press. ISBN 978-O-30019-947-5.

Hsu, Chin-Lung; Lin, Judy Chuan-Chuan (2016). "An empirical examination of consumer adoption of Internet of Things services: Network externalities and concern for information privacy perspectives". Computers in Human Behavior. 62: 516-527. doi:10.1016/j.chb.2016.04.023.

Hussain, A. (June 2017). "Energy Consumption of Wireless IoT Nodes". Norwegian University of Science and Technology.

Huvio, Eero, Grönval, John, Främling, Kary. Tracking and tracing parcels using a distributed computing approach. In: Solem, Olav (ed.) Proceedings of the 14th Annual Conference for Nordic Researchers in Logistics (NOFOMA'2002), Trondheim, Norway, 12-14 Jun. 2002. pp. 29-43.

IJSMI, Editor (April 2018). "Overview of recent advances in Health care technology and its impact on health care delivery". International Journal of Statistics and Medical Informatics. 7: 1-6. SSRN 3169884.

Inc., Apple. "HomeKit—Apple Developer". developer-.apple.com.

Istepanian, R.; Hu, S.; Philip, N.; Sungoor, A. (2011). The potential of Internet of m-health Things "m-IoT" for non-invasive glucose level sensing. Annual International Conference of the IEEE Engineering in Medicine and Biology Society (EMBC). 2011. pp. 5264-6. doi:10.1109/IEMBS.2011.6091302. ISBN 978-1-4577-1589-1. PMID 22255525.

Jing, J.; Li, H. (2012). "Research on the Relevant Standards of Internet of Things". In Wang, Y.; Zhang, X. Internet of Things: International Workshop, IOT 2012. Springer. pp. 627-32. ISBN 9783642324277.

Joyia, Gulraiz J.; Liaqat, Rao M.; Farooq, Aftab; Rehman, Saad (2017). "Internet of Medical Things (IOMT): Applications, Benefits and Future Challenges in Healthcare Domain".

Journal of Communications. doi:10.12720/jcm.12.4.240-247.

Jussi Karlgren; Lennart Fahlén; Anders Wallberg; Pär Hansson; Olov Ståhl; Jonas Söderberg; Karl-Petter Åkesson (2008). Socially Intelligent Interfaces for Increased Energy Awareness in the Home. The Internet of Things. Lecture Notes in Computer Science. 4952. Springer. pp. 263-275. doi:10.1007/978-3-540-78731-0_17. ISBN 978-3-540-78730-3.

Kang, Won Min; Moon, Seo Yeon; Park, Jong Hyuk (5 Mar. 2017). "An enhanced security framework for home appliances in smart home". Human-centric Computing and Information Sciences. 7 (6). doi:10.1186/s13673-017-0087-4.

Kingsley-Hughes, Adrian. "The toxic hellstew survival guide". ZDnet.

Köhn, Rüdiger. "Online-Kriminalität: Konzerne verbünden sich gegen Hacker". Faz.net.

Kovach, Steve (30 Jul. 2013). "Android Fragmentation Report". Business Insider.

Kricka, L J (21 Jun. 2018). "History of disruptions in laboratory medicine: what have we learned from predictions?". Clinical Chemistry and Laboratory Medicine. doi:10.1515/cclm-2018-0518 (inactive 2018-11-07). PMID 29927745.

Kushalnagar, N.; Montenegro, G.; Schumacher, C. (August 2007). IPv6 over Low-Power Wireless Personal Area Networks (6LoWPANs): Overview, Assumptions, Problem Statement, and Goals. IETF. doi:10.17487/RFC4919. RFC 4919.

Lawson, Stephen (2 Mar. 2016). "IoT users could win with a new bill in the US Senate". MIS-Asia.

Lee, Jay (1 Dec. 2003). "E-manufacturing—fundamental, tools, and transformation". Robotics and Computer-Integrated Manufacturing. Leadership of the Future in Manufacturing. 19 (6): 501-507. doi:10.1016/S0736-5845(03)00060-7.

Lee, Jay (19 Nov. 2014). "Keynote Presentation: Recent Advances and Transformation Direction of PHM". Roadmapping Workshop on Measurement Science for Prognostics and Health Management of Smart Manufacturing Systems Agenda.

Lee, Jay (2015). Industrial Big Data. China: Mechanical Industry Press. ISBN 978-7-111-50624-9.

Lee, Jay; Bagheri, Behrad; Kao, Hung-An (2015). "A cyber-physical systems architecture for industry 4.0-based manufacturing systems". Manufacturing Letters. 3: 18-23. doi:10.1016/j.mfglet.2014.12.001.

Li, S. (2017). "Chapter 1: Introduction: Securing the Internet of Things". In Li, S.; Xu, L. D. Securing the Internet of Things. Syngress. p. 4. ISBN 9780128045053.

Li, S.; Xu, L. D., ed. (2017). Securing the Internet of Things. Syngress. p. 154. ISBN 9780128045053.

Li, Shixing; Wang, Hong; Xu, Tao; Zhou, Guiping (2011). Application Study on Internet of Things in Environment Protection Field. Lecture Notes in Electrical Engineering Volume (Submitted manuscript). Lecture Notes in Electrical Engineering. 133. pp. 99-106. doi:10.1007/978-3-642-25992-0_13. ISBN 978-3-642-25991-3.

Light, A.; Rowland, C. (2015). "Chapter 11: Responsible IoT Design". In Rowland, C.; Goodman, E.; Charlier, M.; et al. Designing Connected Products: UX for the Consumer Internet of Things. O'Reilly Media. pp. 457-64. ISBN 9781449372569.

Lindner, Tim (13 Jul. 2015). "The Supply Chain: Changing at the Speed of Technology". Connected World.

Lipsky, Jessica. "IoT Clash Over 900 MHz Options". EETimes.

Littman, Michael; Kortchmar, Samuel (2014-06-11). "The Path To A Programmable World". Footnote.

Lopez, Javier; Rios, Ruben; Bao, Feng; Wang, Guilin (2017). "Evolving privacy: From sensors to the Internet of Things". Future Generation Computer Systems. 75: 46-57. doi:10.1016/j.future.2017.04.045.

Loukas, George (June 2015). Cyber-Physical Attacks A growing invisible threat. Oxford, UK: Butterworh-Heinemann (Elsevier). p. 65. ISBN 9780128012901.

Lovejoy, Ben (2018-08-31). "HomeKit devices getting more affordable as Lenovo announces Smart Home Essentials line". 9 to5Mac.

Magrassi, P. (2 May 2002). "Why a Universal RFID Infrastructure Would Be a Good Thing". Gartner research report G00106518.

Magrassi, P.; Berg, T (12 Aug. 2002). "A World of Smart Objects". Gartner research report R-17-2243.

Mahmood, Z. (2018). Connected Environments for the Internet of Things: Challenges and Solutions. Springer. pp. 89-90. ISBN 9783319701028.

Mahmud, Khizir; Town, Graham E.; Morsalin, Sayidul; Hossain, M. J. (February 2018). "Integration of electric vehicles and management in the internet of energy". Renewable and Sustainable Energy Reviews. 82: 4179-4203. doi:10.1016/j.rser.2017.11.004.

Marginean, M.-T.; Lu, C. (2016). "sDOMO communication protocol for home robotic systems in the context of the internet of things". Computer Science, Technology And Application. World Scientific. pp. 151-60. ISBN 9789813200432.

Mattern, Friedemann; Floerkemeier, Christian (2010). "From the Internet of Computer to the Internet of Things". Informatik-Spektrum. 33 (2): 107-121. Bibcode:2009InfSp . . . 32 . . . 496H. doi:10.1007/s00287-010-0417-7.

McEwan, Adrian (2014). "Designing the Internet of Things".

Meola, A. (20 Dec. 2016). "Why IoT, big data & smart farming are the future of agriculture". Business Insider. Insider, Inc.

Merritt, Rick. "13 Views of IoT World". EETimes.

Minteer, A. (2017). "Chapter 9: Applying Geospatial Analytics to IoT Data". Analytics for the Internet of Things (IoT). Packt Publishing. pp. 230-57. ISBN 9781787127579.

Mulvenna, Maurice; Hutton, Anton; Martin, Suzanne; Todd, Stephen; Bond, Raymond; Moorhead, Anne (14 Dec. 2017). "Views of Caregivers on the Ethics of Assistive Technology Used for Home Surveillance of People Living with Dementia". Neuroethics. 10 (2): 255-266. doi:10.1007/s12152-017-9305-z. PMC 5486509. PMID 28725288.

Nguyen, Dang Tu; Song, Chengyu; Qian, Zhiyun; V. Krishnamurthy, Srikanth; J. M. Colbert, Edward; McDaniel, Patrick (2018). IoTSan: Fortifying the Safety of IoT Systems. Proc. of the 14th International Conference on emerging Networking EXperiments and Technologies (CoNEXT '18). Heraklion, Greece. doi:10.1145/3281411.3281440. arXiv:1810.09551.

Nordrum, Amy (18 Aug. 2016). "Popular Internet of Things Forecast of 50 Billion Devices by 2020 Is Outdated". IEEE.

Pal, Arpan (May-June 2015). "Internet of Things: Making the Hype a Reality". IT Pro.

Parello, J.; Claise, B.; Schoening, B.; Quittek, J. (28 Apr. 2014). "Energy Management Framework". IETF Internet Draft <draft-ietf-eman-framework-19>.

Perera, C.; Liu, C. H.; Jayawardena, S. (December 2015). "The Emerging Internet of Things Marketplace From an Industrial Perspective: A Survey". IEEE Transactions on Emerging Topics in Computing. 3 (4): 585-598. arXiv:1502.00134. doi:10.1109/TETC.2015.2390034. ISSN 2168-6750.

Piedad, Floyd N. "Will Android fragmentation spoil its IoT appeal?". TechBeacon.

Pittman, F. Paul (2 Feb. 2016). "Legal Developments in Connected Car Arena Provide Glimpse of Privacy and Data Security Regulation in Internet of Things". Lexology.

Pontin, Jason (29 Sep. 2005). "ETC: Bill Joy's Six Webs". MIT Technology Review.

Poon, L. (22 Jun. 2018). "Sleepy in Songdo, Korea's Smartest City". CityLab. Atlantic Monthly Group.

Prospero, Mike (2018-09-12). "Best Smart Home Hubs of 2018". Tom's Guide.

Raggett, Dave (27 Apr. 2016). "Countering Fragmentation with the Web of Things: Interoperability across IoT platforms". W3C.

Raji, R S (June 1994). "Smart networks for control". IEEE Spectrum.

Rasit, Yuce, Mehmet; Claus, Beisswenger, Stefan; Mangalam, Srikanth; Das, Prasanna, Lal; Martin, Lukac (2017-11-02). "Internet of things: the new government to business platform—a review of opportunities, practices, and challenges": 1-112.

Reddington, Clare. "Connected Things and Civic Responsibilities". Storify.

Reza Arkian, Hamid (2017). "MIST: Fog-based Data Analytics Scheme with Cost-Efficient Resource Provisioning for IoT Crowdsensing Applications". Journal of Network and Computer Applications. 82: 152-165. Bibcode: 2017JNCA . . . 93 . . . 27H. doi:10.1016/j.jnca.2017.01.012.

Rico, Juan (22-24 Apr. 2014). "Going beyond monitoring and actuating in large scale smart cities". NFC & Proximity Solutions—WIMA Monaco.

Roman, D. H.; Conlee, K. D. (29 Jun. 2015). "The Digital Revolution Comes to US Healthcare". Goldman Sachs.

Rowayda, A. Sadek (May 2018). "—An Agile Internet of Things (IoT) based Software Defined Network (SDN) Architecture". Egyptian Computer Science Journal.

Rowland, C.; Goodman, E.; Charlier, M.; et al., eds. (2015). Designing Connected Products: UX for the Consumer Internet of Things. O'Reilly Media. p. 726. ISBN 9781449372569.

Samsung's SmartThings

Santucci, Gérald. "The Internet of Things: Between the Revolution of the Internet and the Metamorphosis of Objects". European Commission Community Research and Development Information Service.

Schneier, Bruce (1 Feb. 2017). "Security and the Internet of Things".

Schneier, Bruce (6 Oct. 2016). "We Need to Save the Internet from the Internet of Things". Motherboard.

Scientific American, April 2015, p. 68.

Severi, S.; Abreu, G.; Sottile, F.; Pastrone, C.; Spirito, M.; Berens, F. (23-26 Jun. 2014). "M2M Technologies: Enablers for a Pervasive Internet of Things". The European Conference on Networks and Communications (EU-CNC2014).

Sheng, M.; Qun, Y.; Yao, L.; Benatallah, B. (2017). Managing the Web of Things: Linking the Real World to the Web. Morgan Kaufmann. pp. 256-8. ISBN 9780128097656.

Singh, Jatinder; Pasquier, Thomas; Bacon, Jean; Ko, Hajoon; Eyers, David (2015). "Twenty Cloud Security Considerations for Supporting the Internet of Things". IEEE Internet of Things Journal. 3 (3): 1. doi:10.1109/JIOT.2015.2460333.

Solaimani, Sam; Keijzer-Broers, Wally; Bouwman, Harry (2015-05-01). "What we do—and don't—know about the Smart Home: An analysis of the Smart Home literature". Indoor and Built Environment. 24 (3): 370-383. doi: 10.1177/1420326X13516350. ISSN 1420-326X.

Steinberg, Joseph (27 Jan. 2014). "These Devices May Be Spying On You (Even In Your Own Home)". Forbes.

Sun, Charles C. (1 May 2014). "Stop using Internet Protocol Version 4!". Computerworld.

Swan, Melanie (8 Nov. 2012). "Sensor Mania! The Internet of Things, Wearable Computing, Objective Metrics, and the Quantified Self 2.0". Sensor and Actuator Networks. 1 (3): 217-253. doi:10.3390/jsan1030217.

Tan, Lu; Wang, Neng (20-22 Aug. 2010). Future Internet: The Internet of Things. 3rd International Conference on Advanced Computer Theory and Engineering (ICACTE). 5. pp. 376-380. doi:10.1109/ICACTE.2010.5579543. ISBN 978-1-4244-6539-2.

Thomas, Daniel R.; Beresford, Alastair R.; Rice, Andrew (2015). Proceedings of the 5th Annual ACM CCS Workshop on Security and Privacy in Smartphones and Mobile Devices —SPSM '15. Computer Laboratory, University of Cambridge. pp. 87-98. doi:10.1145/2808117.2808118. ISBN 9781450338196.

Thomas, Jayant; Traukina, Alena (2018). Industrial Internet Application Development: Simplify IIoT development using the elasticity of Public Cloud and Native Cloud Services. Packt Publishing. p. 25. ISBN 978-1788298599.

Thompson, Kirsten; Mattalo, Brandon (24 Nov. 2015). "The Internet of Things: Guidance, Regulation and the Canadian Approach". CyberLex.

Thomson, S.; Narten, T.; Jinmei, T. (September 2007). 1Pv6 Stateless Address Autoconfiguration. IETF. doi:10.17487/RFC4862. RFC 4862.

Topol, Eric (2016). The Patient Will See You Now: The Future of Medicine Is in Your Hands. Basic Books. ISBN 978-0465040025.

Traukina, Alena; Thomas, Jayant; Tyagi, Prashant; Reddipalli, Kishore (2018-09-29). Industrial Internet Application Development: Simplify IIoT development using the elasticity of Public Cloud and Native Cloud Services (1st ed.). Packt Publishing.

Tung, Liam (13 Oct. 2015). "Android security a 'market for lemons' that leaves 87 percent vulnerable". ZDNet.

Umar Zakir Abdul, Hamid; et al. (2019). Internet of Vehicle (IoV) Applications in Expediting the Implementation of Smart Highway of Autonomous Vehicle: A Survey. Performability in Internet of Things. EAT/Springer Innovations in Communication and Computing. pp. 137-157. doi:10.1007/978-3-319-93557-7_9. ISBN 978-3-319-93556-0.

van der Zee, E.; Scholten, H. (2014). "Spatial Dimensions of Big Data: Application of Geographical Concepts and Spatial Technology to the Internet of Things". In Bessis, N.; Dobre, C. Big Data and Internet of Things: A Roadmap for Smart Environments. Springer. pp. 137-68. ISBN 9783319050294.

Verbeek, Peter-Paul (2011). Moralizing Technology: Understanding and Designing the Morality of Things. Chicago: The University of Chicago Press. ISBN 978-O-22685-291-1.

Vermesan, Ovidiu; Friess, Peter (2013). Internet of Things: Converging Technologies for Smart Environments and Integrated Ecosystems. Aalborg, Denmark: River Publishers. ISBN 978-87-92982-96-4.

Vongsingthong, S.; Smanchat, S. (2014). "Internet of Things: A review of applications & technologies". Suranaree Journal of Science and Technology.

Waldner, Jean-Baptiste (2007). Nanoinformatique et intelligence ambiante. Inventer l'Ordinateur du XXleme Siècle. London: Hermes Science. p. 254. ISBN 978-2-7462-1516-0.

Waldner, Jean-Baptiste (2008). Nanocomputers and Swarm Intelligence. London: ISTE. pp. 227-231. ISBN 978-1-84704-002-2.

Wallace, Michael (19 Feb. 2016). "Fragmentation is the enemy of the Internet of Things". Qualcomm.com.

Walsh, Kit (5 Apr. 2016). "Nest Reminds Customers That Ownership Isn't What It Used to Be". Electronic Frontier Foundation.

Want, Roy; Bill N. Schilit, Scott Jenson (2015). "Enabling the Internet of Things". 1. Sponsored by IEEE Computer Society. IEEE. pp. 28-35.

Ward, Mark (23 Sep. 2015). "Smart devices to get security tune-up". BBC News.

Webb, Geoff (5 Feb. 2015). "Say Goodbye to Privacy". WIRED.

Weber, R. H.; Weber, R. (2010). Internet of Things: Legal Perspectives. Springer Science & Business Media. pp. 59-64. ISBN 9783642117107.

Weiser, Mark (1991). "The Computer for the 21st Century". Scientific American. 265 (3): 94-104. Bibcode: 1991SciAm.265c . . . 94W. doi:10.1038/scientificamerican0991-94.

Westerlund, Mika; Leminen, Seppo; Rajahonka, Mervi (2014). "Designing Business Models for the Internet of Things". Technology Innovation Management Review. 4 (7). ISSN 1927-0321.

Wieland, Ken (25 Feb. 2016). "IoT experts fret over fragmentation". Mobile World.

Wigmore, I. (June 2014). "Internet of Things (IoT)". TechTarget.

Witkovski, A.; A. O. Santin; J. E. Marynowski; V. Abreu Jr. (December 2016). "An IdM and Key-based Authentication Method for providing Single Sign-On in IoT". IEEE Globecom.

Wollerton, Megan (2018 Jun. 3). "Here's everything you need to know about Apple HomeKit". CNET.

Wood, Alex (31 Mar. 2015). "The internet of things is revolutionizing our lives, but standards are a must". The Guardian.

Woolf, Nicky (26 Oct. 2016). "DDoS attack that disrupted internet was largest of its kind in history, experts say". The Guardian.

Xie, Xiao-Feng; Wang, Zun-Jing (2017). "Integrated in-vehicle decision support system for driving at signalized intersections: A prototype of smart IoT in transportation". Transportation Research Board (TRB) Annual Meeting, Washington, D.C., USA.

Yang, Chen; Shen, Weiming; Wang, Xianbin (January 2018). "The Internet of Things in Manufacturing: Key Issues and Potential Applications". IEEE Systems, Man, and Cybernetics Magazine. 4(1): 6-15. doi:10.1109/MSMC.2017.2702391.

Yarmoluk, Dan. "5 Barriers to IoT Adoption & How to Overcome Them". ATEK Access Technologies.

Yoshigoe, Kenji; Dai, Wei; Abramson, Melissa; Jacobs, Alexander (2015). Overcoming Invasion of Privacy in Smart Home Environment with Synthetic Packet Injection. TRON Symposium (Tronshow). p. 1. doi:10.1109/tronshow.2014.7396875. ISBN 978-4-8936-2317-1.

Zhang, Q. (2015). Precision Agriculture Technology for Crop Farming. CRC Press. pp. 249-58. ISBN 9781482251081.

SUMMARY OF THE INVENTION

In order to provide sufficient Quality of Assurance (QA) for a wireless network, it is of paramount importance to test a network of devices. As part of this process, in addition to outdoor testing with representative scenarios, it is customary to create a "testbed" in the "lab". This is typically done by connecting the wireless devices using wires, or a shared medium such as Ethernet, and then manipulating the connectivity so that the desired network topology is obtained for running tests.

The state of art in such testing uses stationary devices and allows testing of static connectivity, that is, where the connectivity between devices does not change or is changed manually. Due to this, the dynamic connectivity experienced by nodes in a mobile ad hoc network cannot be adequately modeled in a wireless testbed.

The present invention provides a method and apparatus for automatically modeling any given mobility pattern or pattern of connectivity dynamics, while still using a stationary, static testbed. This is done by automatically changing the attenuation on the wires between wireless devices in accordance with the expected attenuation changes that the devices would experience were they to move in that mobility pattern or experience the connectivity dynamics. This may be implemented in both real-time and non-real-time.

A model for real-world connectivity dynamism may be implemented as a standalone process in Computer A. This may be based off of a predefined mobility model (e.g. Random Waypoint model, etc.), or a sequence of link up/downs based on a connectivity dynamism model.

A method is provided to track the path loss matrix between devices at periodic time snapshots in accordance with the mobility or dynamic connectivity model in Computer A and feed it to a Computer B. In other words, mobility/dynamism is captured as a time-varying sequence of path losses between every pair of nodes.

A testbed of devices is provided which is pairwise connected using a stack of attenuators, each aggregate stack settable to a desired attenuation using dedicated Computers $C_{x,y}$, (e.g., Raspberry Pi) for each pair of devices (x,y).

The technology also provides a method running, e.g., on Computer B, that takes each entry in the path loss matrix M obtained from Computer A, and sends the value of entry M(x,y) to the Computer $C_{x,y}$ corresponding to the pair of devices x,y.

A method is also provided for connecting Computer $C_{x,y}$ to each of the attenuators in the attenuator stack, and a process runs on each Computer $C_{x,y}$ that sets the attenuation of each individual attenuator in the stack, so that the combined attenuation is equal to the value received from Computer B.

The above steps may be executed in real-time, that is, the path loss matrices are sent from Computer A to B to C as they are generated, or in non-real-time, that is, sent in a batch after the model terminates.

It is therefore an object to provide a radio frequency device, comprising: a packet data interface port; a radio frequency signal input port; a modified radio frequency signal output port; a microcontroller, configured to: control the packet data interface port, receive an input control signal through the packet data interface port, transmit a status report through the packet data interface port, and produce an output control signal in dependence on the input control signal; and a radio frequency signal control device, configured to modify a radio frequency signal received through the radio frequency signal input port according to an analog radio frequency signal modification process, over a range of modification selectively controlled in dependence on the output control signal, and to communicate the modified radio frequency signal through the modified radio frequency signal output port.

The packet data interface port may comprise an IEEE 802 port and the microcontroller may transmit the status report through the IEEE 802 port to a remote server.

The radio frequency signal control device may comprise at least one of a radio frequency attenuator, a radio frequency delay, a radio frequency noise source, a radio frequency filter, a radio frequency equalizer, and a radio frequency amplifier. The output control signal may comprise an analog output signal.

The radio frequency device may further comprise a control processor, communicating through the packet data interface port with the microcontroller, the control processor being configured to: generate a plurality of the input control signals for a plurality of respective radio frequency devices; and coordinate the plurality of respective radio frequency devices to concurrently modify a plurality of radio frequency signals. The control processor may be configured to control the plurality of respective radio frequency devices, to dynamically change the plurality of input control signals over time. The plurality of input control signals may be dynamically changed over time to emulate radio frequency conditions resulting from mobility of nodes in a mobile ad hoc radio frequency communication network, wherein each radio frequency signal control device emulates a radio frequency path within the mobile ad hoc radio frequency communication network.

It is a further object to provide a method, comprising: receiving an input control signal through a packet data interface port of a radio frequency device comprising a microcontroller having a packet data interface port; transmitting a status report from the microcontroller through the associated packet data interface port; producing an output control signal from the microcontroller in dependence on the input control signal; and modifying a received radio frequency signal with an analog radio frequency signal modification device, over a range of analog signal modification, selectively in dependence on the output control signal.

The packet data interface port may comprise an IEEE 802 port, and the method may further comprise transmitting the status report through the IEEE 802 port to a remote server.

The radio frequency signal modification device may comprise at least one of a radio frequency attenuator, a radio frequency delay, a radio frequency noise source, a radio frequency filter, a radio frequency equalizer, and a radio frequency amplifier. The radio frequency signal control device may comprise a radio frequency signal generator. The radio frequency signal control device may comprise a radio frequency switch matrix. The output control signal may comprise an analog output signal.

The method may further comprise communicating through the packet data interface port between a remote control processor and the microcontroller, the remote control processor generating a plurality of the input control signals for a plurality of respective radio frequency devices comprising the microcontroller and the analog radio frequency signal modification device.

The control processor may coordinate the plurality of respective radio frequency devices comprising the microcontroller and the analog radio frequency signal modification device to concurrently dynamically modify a plurality of radio frequency signals over time.

The method may further comprise modelling mobility of a node in an ad hoc network comprising a plurality of nodes; defining a path loss matrix selectively dependent on the modelled mobility of the plurality of nodes in the ad hoc network; and said modifying the received radio frequency signal comprises emulating the modelled mobility of the plurality of nodes with respect to modifications of respective received radio frequency signals from a plurality of other nodes.

The method may further comprise dynamically changing the plurality of input control signals are over time to emulate radio frequency conditions resulting from mobility of nodes in a mobile ad hoc radio frequency communication network, wherein each radio frequency signal modification device emulates a radio frequency path within the mobile ad hoc radio frequency communication network.

It is a still further object to provide a testing system, comprising: a plurality of radio frequency devices, each radio frequency device comprising:
a packet data interface port,
a microcontroller configured to:
control the packet data interface port,
receive an input control signal through the packet data interface port,
transmit a status report through the packet data interface port, and
produce an output control signal in dependence on the input control signal, to control a radio frequency signal modification device for modification of a received radio frequency signal over an analog range of modification, selectively in dependence on the output control signal;
a control processor, communicating through the packet data interface port of each respective radio frequency device with the respective microcontroller of the respective radio frequency device, the control processor being configured to generate a plurality of the input control signals for the plurality of respective radio frequency devices; and
a mobility simulator, configured to generate a dynamically changing model of a multi-node communication network subject to changing communication channels, wherein the mobility simulator is configured to provide the dynamically changing model to the control processor.

Each respective radio frequency signal control device may be controlled according to the respective input control signal to vary a path loss over time and the path loss varies over time to emulate mobility according to at least one of a free space algorithm and a two-ray algorithm.

The mobility simulator may be configured to generate a matrix representing mobility model-consistent changes of the modification of the received radio frequency signals by the plurality of radio frequency devices, and the input control signals generated by the control processor comprise cell values of the matrix, sent to respective radio frequency devices.

It is also an object to provide a device, comprising a microcontroller having a packet data interface port, configured to control the packet data interface port, receive an input control signal through the packet data interface port, transmit a status report through the packet data interface port, and in dependence on the input control signal, produce an output control signal; and a radio frequency signal control device, configured to modify a received radio frequency signal over a range selectively in dependence on the output control signal.

It is a further object to provide a method, comprising: receiving a input control signal through a packet data interface port of a device comprising a microcontroller having a packet data interface port; transmitting a status report through the packet data interface port; producing an output control signal in dependence on the input control signal; and modifying a received radio frequency signal with a radio frequency signal control device, over a range of modification, selectively in dependence on the output control signal.

It is a still further object to provide a device, comprising: a packet data interface port; a microcontroller, configured to control the packet data interface port, receive a input control signal through the packet data interface port, transmit a status report through the packet data interface port, and in dependence on the input control signal, produce an output control signal; and a radio frequency modification device, configured to modify a received radio frequency signal over a range selectively in dependence on the output control signal.

It is also an object to provide a testing system, comprising: a device, comprising a packet data interface port, a microcontroller configured to control the packet data interface port, receive a input control signal through the packet data interface port, transmit a status report through the packet data interface port, and in dependence on the input control signal, and produce an output control signal to control a radio frequency signal control device for modifying a received radio frequency signal over a range selectively in dependence on the output control signal; a control processor, communicating through the packet data interface port with the microcontroller, configured to generate a plurality of the input control signals for a plurality of respective devices comprising the microcontroller and the radio frequency signal control device; and a mobility simulator, configured to generate a dynamically changing model of a multi-node communication network subject to changing communication channels, wherein the mobility simulator is configured to provide the dynamically changing model to the control processor.

The report may be, for example, an acknowledgement message or flag within a message, that verifies that indicates a status of the device, of the radio frequency signal modified by the device, or a response to the radio frequency signal, for example. The report may be broadcast to all nodes, to selected nodes, e.g., adjacent or nearby nodes, or communicated to specific nodes and/or a centralized controller. In a complex environment, where signal communication is not guaranteed, acknowledgements and reports may help distinguish between different types of communication issues, especially within a testbed environment, where multiple variables may be at play. In addition, in some cases, the testbed is used outside of a laboratory environment, or portions reside outside the environment, and reports are useful even where reliable performance of most nodes in accordance with commands issued for them is assured.

The packet data interface port comprises at least one of an Ethernet port, a wireless Ethernet port, and an IEEE 802.11 wireless Ethernet port.

The radio frequency signal control device may comprise at least one of a radio frequency attenuator, a radio frequency delay, a radio frequency noise source, a radio frequency filter, a radio frequency equalizer, a radio frequency signal generator, a radio frequency switch matrix, and a radio frequency amplifier.

The output control signal may comprise at least one of an analog output signal, a serial data digital output signal, a parallel data digital multibit output signal, and a parallel binary-weighted multibit digital output signal.

The system may further comprise a control processor, communicating through the packet data interface port with the microcontroller, the control processor being configured to generate a plurality of the input control signals for a plurality of respective devices comprising the microcontroller and the radio frequency signal control device. The control processor may be configured to coordinate the plurality of respective devices comprising the microcontroller and the radio frequency signal control device to concurrently modify a plurality of radio frequency signals. The control processor may be configured to dynamically change the plurality of input control signals over time.

The plurality of input control signals may be dynamically changed over time to emulate radio frequency conditions resulting from mobility of nodes in a mobile ad hoc radio frequency communication network.

It is a further object to provide a method of testing radio frequency ad hoc network communication devices, comprising: providing a plurality of node device, each node device comprising a microcontroller configured to interface to a digital communication network, to receive control parameters, a radio frequency signal modification device, configured to modify a received radio frequency signal selectively dependent on the control parameters, an RF input port configured to receive the radio frequency signal, and an RF output port configured to transmit a modified radio frequency signal; receiving the control parameters through the digital communication network; and modifying the received radio frequency signal according to the received control parameters.

The method may further comprise communicating a report from the microcontroller through the digital communication network.

The method may further comprise interfacing a radio frequency transceiver to the RF output port, wherein a modification of a transmitted signal from the radio frequency transceiver is asymmetric with a modification of a received signal to the radio frequency transceiver.

The method may further comprise interfacing a radio frequency transceiver to the RF output port, wherein the transmitted signal from the radio frequency transceiver is not modified and the received signal to the radio frequency transceiver is modified.

The method may further comprise interfacing a radio frequency transceiver to the RF output port, wherein a modification of a transmitted signal from the radio frequency transceiver is symmetric with a modification of a received signal to the radio frequency transceiver.

The radio frequency signal modification device may comprise a programmable attenuator and/or a programmable delay configured to emulate multipath signal distortion.

The microcontroller may communicate though the digital communication network with a coordination server configured to communicate with a plurality of microcontrollers, wherein the RF output of a plurality of a first node interface device is connected to the RF input of a second node interface device and a third node interface device, the RF output of a plurality of the second node interface device is connected to the RF input of the first second node interface device and the third node interface device, and the RF output of the third node interface device is connected to the RF input of the first node interface device and the second node interface device.

The control parameters may comprise parameters describing a change in radio frequency modification over time. The control parameters comprise parameters are derived from a mobility model.

The method may further comprise modelling mobility of the node interface device; defining a path loss matrix selectively dependent on the modelled mobility of the node interface device; and said modifying the received radio frequency signal according to the received control parameters comprises emulating the modelled mobility with respect to modifications of the received radio frequency signal.

The method may further comprise modelling mobility of the node interface device in an ad hoc network comprising a plurality of node interface devices; defining a path loss matrix selectively dependent on the modelled mobility of the node interface device in the ad hoc network comprising the plurality of node interface devices; and said modifying the received radio frequency signal according to the received control parameters comprises emulating the modelled mobility of the plurality of node interface devices with respect to modifications of respective received radio frequency signals from a plurality of other node interface devices.

The path loss matrix may define a change of network state over time.

The RF output of a first node interface device may be conveyed to serve as an RF input to a second node interface device, substantially without an intervening active RF signal modification device, such that the RF output of the second node interface device is a composite of the modification by the received radio frequency signal by the first node interface device and the second node interface device.

A plurality of node interface devices may be provided, and configured to form an ad hoc network test bed. The control parameters may be received from a computational network simulator.

The method may further comprise interfacing a radio frequency receiver to the RF output, analyzing the modified radio frequency signal with the radio frequency receiver, and comparing the analyzing modified radio frequency signal with a result from the computational network simulator.

The method may further comprise updating a network model employed by the computational network simulator based on the analyzed modified radio frequency signal and/or updating a radio frequency receiver model employed by the computational network simulator based on the analyzed modified radio frequency signal.

Yet another aspect of the disclosure is directed to a non-transitory computer readable medium having a plurality of computer executable instructions for causing the systems as described above to operate.

DETAILED DESCRIPTION OF THE PREFERRED EMBODIMENTS

Figure 1:
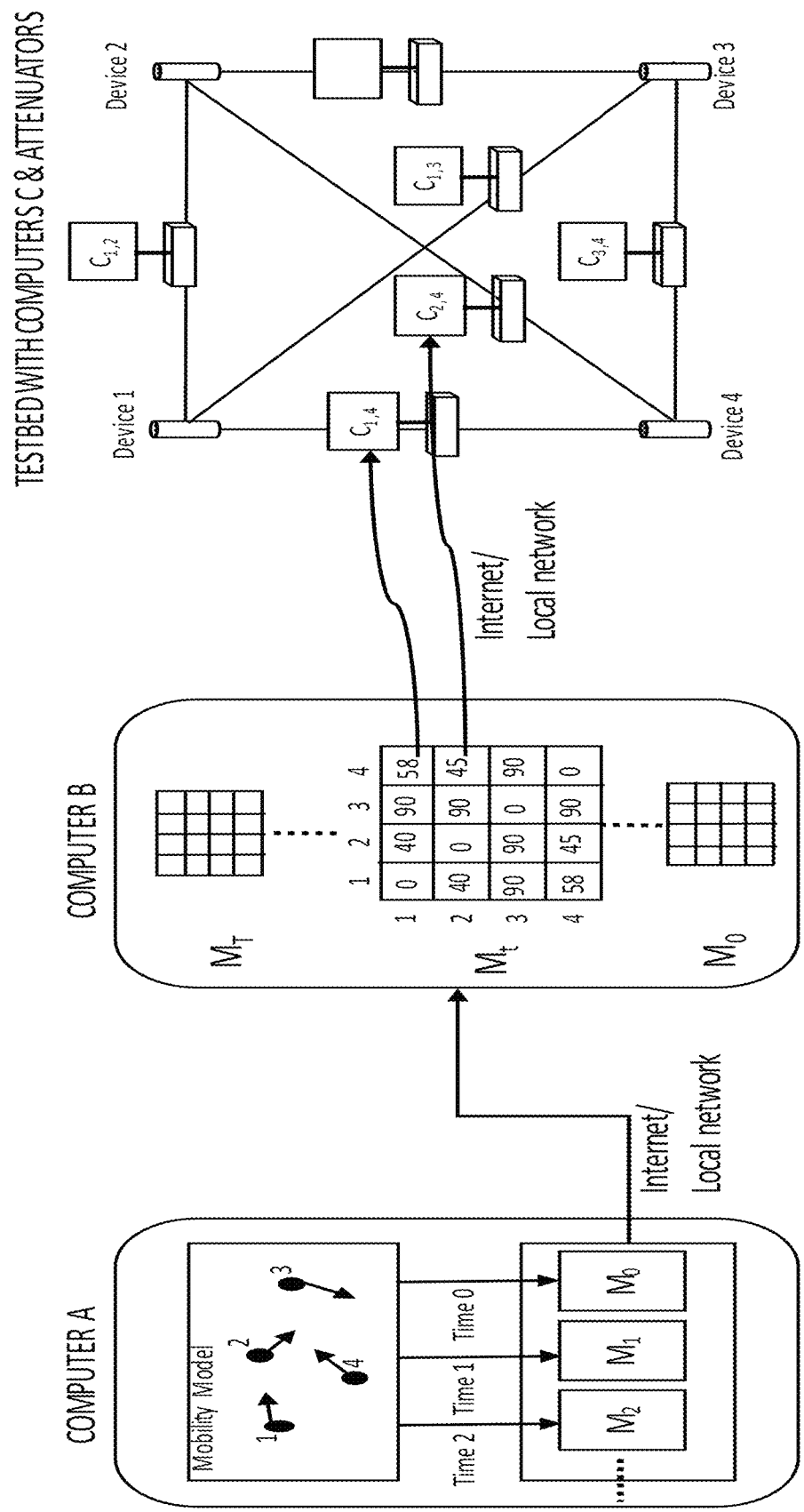
FIG. 1 shows a schematic drawing of the invention.

A schematic of the invention is shown in FIG. 1. An exemplary mobile network with 4 nodes is depicted, with a notional exemplary connectivity matrix $M_t$ at time t. Also shown are examples of setting of link (1,4) and (2,4) using computers $C_{1,4}$ and $C_{2,4}$ respectively, which in turn receive the attenuation values from Computer B based on the matrix $M_t$.

As a result of the apparatus and methods mentioned above, any given mobility pattern can be modeled on a stationary testbed. That is, the system takes as input a predefined mobility pattern over a specified number of nodes, and the protocol software is executed as though the devices are moving in that pattern, but in reality they are stationary. This allows substantially more comprehensive Quality Assurance, especially when the product in question is applicable primarily to mobile contexts.

A mobility model consists of a) a certain number nodes representing wireless devices, and a representative transmission range; (b) an area of operation; and b) a trajectory of movement for each node in (a), including the average velocity. Several models of mobility have been proposed in the literature, for example, Random Waypoint, Gauss-Markov, Truncated Levy Walk, etc. See:

Ahmed, Sabbir, Gour C. Karmakar, and Joarder Kamruzzaman. "An environment-aware mobility model for wireless ad hoc network." Computer Networks 54, no. 9 (2010): 1470-1489.

Al-Sultan, Saif, Moath M. Al-Doori, Ali H. Al-Bayatti, and Hussien Zedan. "A comprehensive survey on vehicular ad hoc network." Journal of network and computer applications 37 (2014): 380-392.

Ariyakhajorn, Jinthana, Pattana Wannawilai, and Chanboon Sathitwiriyawong. "A comparative study of random waypoint and gauss-markov mobility models in the performance evaluation of manet." In Communications and Information Technologies, 2006. ISCIT'06. International Symposium on, pp. 894-899. IEEE, 2006.

Aschenbruck, Nils, Elmar Gerhards-Padilla, and Peter Martini. "A survey on mobility models for performance analysis in tactical mobile networks." Journal of Telecommunications and Information Technology (2008): 54-61.

Aschenbruck, Nils, Raphael Ernst, Elmar Gerhards-Padilla, and Matthias Schwamborn. "BonnMotion: a mobility scenario generation and analysis tool." In Proceedings of the 3rd international ICST conference on simulation tools and techniques, p. 51. ICST (Institute for Computer Sciences, Social-Informatics and Telecommunications Engineering), 2010.

Bai, Fan, and Ahmed Helmy. "A survey of mobility models." Wireless Adhoc Networks. University of Southern California, USA 206 (2004): 147.

Bekmezci, Ilker, Ozgur Koray Sahingoz, and Şamil Temel. "Flying ad-hoc networks (FANETs): A survey." Ad Hoc Networks 11, no. 3 (2013): 1254-1270.

Blakely, Ken, and Bruce Lowekamp. "A structured group mobility model for the simulation of mobile ad hoc networks." In Proceedings of the second international workshop on Mobility management & wireless access protocols, pp. 111-118. ACM, 2004.

Blum, Jeremy J., Azim Eskandarian, and Lance J. Hoffman. "Challenges of intervehicle ad hoc networks." IEEE transactions on intelligent transportation systems 5, no. 4 (2004): 347-351.

Cavin, David, Yoav Sasson, and André Schiper. "On the accuracy of MANET simulators." In Proceedings of the second ACM international workshop on Principles of mobile computing, pp. 38-43. ACM, 2002.

Choffnes, David R., and Fabian E. Bustamante. "An integrated mobility and traffic model for vehicular wireless networks." In Proceedings of the 2nd ACM international workshop on Vehicular ad hoc networks, pp. 69-78. ACM, 2005.

Conti, Marco, and Silvia Giordano. "Multihop ad hoc networking: The theory." IEEE Communications Magazine 45, no. 4 (2007).

Divecha, Bhavyesh, Ajith Abraham, Crina Grosan, and Sugata Sanyal. "Impact of node mobility on MANET routing protocols models." JDIM 5, no. 1 (2007): 19-23.

Eltahir, Ibrahim Khider. "The impact of different radio propagation models for mobile ad hoc networks (MANET) in urban area environment." In null, p. 30. IEEE, 2007.

Geise, Barry C. Airborne Directional Networking: Topology Control Protocol Design. Air Force Institute Of Technology Wright-Patterson AFB OH, 2016.

Hanzo, Lajos, and Rahim Tafazolli. "A survey of QoS routing solutions for mobile ad hoc networks." IEEE Communications Surveys & Tutorials 9, no. 2 (2007): 50-70.

Harri, Jerome, Fethi Filali, and Christian Bonnet. "Mobility models for vehicular ad hoc networks: a survey and taxonomy." IEEE Communications Surveys & Tutorials 11, no. 4 (2009).

Hinds, Alex, Michael Ngulube, Shaoying Zhu, and Hussain Al-Aqrabi. "A review of routing protocols for mobile ad-hoc networks (manet)." International journal of information and education technology 3, no. 1 (2013): 1.

Jayakumar, Geetha, and G. Gopinath. "Performance comparison of manet protocols based on manhattan grid mobility model." Journal of Mobile communication 2, no. 1 (2008): 18-26.

Kumar, Santosh, S. C. Sharma, and Bhupendra Suman. "Mobility metrics based classification & analysis of mobility model for tactical network." International Journal of Next-Generation Networks 2, no. 3 (2010): 39-51.

Kurkowski, Stuart, Tracy Camp, and Michael Colagrosso. "MANET simulation studies: the incredibles." ACM SIGMOBILE Mobile Computing and Communications Review 9, no. 4 (2005): 50-61.

Lan, Kun-chan, and Chien-Ming Chou. "Realistic mobility models for vehicular ad hoc network (VANET) simulations." In ITS Telecommunications, 2008. ITST 2008. 8th International Conference on, pp. 362-366. IEEE, 2008.

Lee, Kevin C., Uichin Lee, and Mario Gerla. "Survey of routing protocols in vehicular ad hoc networks." In Advances in vehicular ad-hoc networks: Developments and challenges, pp. 149-170. IGI Global, 2010.

Li, Fan, and Yu Wang. "Routing in vehicular ad hoc networks: A survey." IEEE Vehicular technology magazine 2, no. 2 (2007).

Lin, Guolong, Guevara Noubir, and Rajmohan Rajaraman. "Mobility models for ad hoc network simulation." In INFOCOM 2004. Twenty-third AnnualJoint Conference of the IEEE Computer and Communications Societies, vol. 1. IEEE, 2004.

Manvi, S. S., M. S. Kakkasageri, and C. V. Mahapurush. "Performance analysis of AODV, DSR, and swarm intelligence routing protocols in vehicular ad hoc network environment." In Future Computer and Communication, 2009. ICFCC 2009. International Conference on, pp. 21-25. IEEE, 2009.

Martinez, Francisco J., Chai Keong Toh, Juan-Carlos Cano, Carlos T. Calafate, and Pietro Manzoni. "A survey and comparative study of simulators for vehicular ad hoc networks (VANETs)." Wireless Communications and Mobile Computing 11, no. 7 (2011): 813-828.

Mousavi, Seyed Morteza, Hamid R. Rabiee, M. Moshref, and A. Dabirmoghaddam. "Mobisim: A framework for simulation of mobility models in mobile ad-hoc networks." In Wireless and Mobile Computing, Networking and Communications, 2007. WiMOB 2007. Third IEEE International Conference on, pp. 82-82. IEEE, 2007.

Su, Jing, Alvin Chin, Anna Popivanova, Ashvin Goel, and Eyal De Lara. "User mobility for opportunistic ad-hoc networking." In Mobile Computing Systems and Applications, 2004. WMCSA 2004. Sixth IEEE Workshop on, pp. 41-50. IEEE, 2004.

Timcenko, Valentina, Mirjana Stojanovic, and Slavica Bostjancic Rakas. "MANET routing protocols vs. mobility models: performance analysis and comparison." In Proceedings of the 9th WSEAS international conference on Applied informatics and communications, pp. 271-276. World Scientific and Engineering Academy and Society (WSEAS), 2009.

Ververidis, Christopher N., and George C. Polyzos. "Service discovery for mobile ad hoc networks: a survey of issues and techniques." IEEE Communications Surveys & Tutorials 10, no. 3 (2008).

Yousefi, Saleh, Mahmoud Siadat Mousavi, and Mahmoud Fathy. "Vehicular ad hoc networks (VANETs): challenges and perspectives." In ITS Telecommunications Proceedings, 2006 6th International Conference on, pp. 761-766. IEEE, 2006.

Zhao, Kai, Sasu Tarkoma, Siyuan Liu, and Huy Vo. "Urban human mobility data mining: An overview." In Big Data (Big Data), 2016 IEEE International Conference on, pp. 1911-1920. IEEE, 2016.

For example, in the Random Waypoint model each node picks a random location within the area of operation and moves towards that with constant specified velocity. When it reaches that location, it is stationary for a predefined amount of time and then repeats the process. This is done by each node of the network.

Any appropriate mobility model could be used, and in some cases, a mobility model may be defined by performance constraints (e.g., empirically based on performance of the system). One may define and implement one's own model. In the exemplary implementation, a model in github.com/panisson/pymobility has been used; however, this is only an example.

Instead of a mobility model, one could have a model for when links go down or come up: a connectivity dynamism model. In both cases, there is a connectivity snapshot at every time instant t. Similarly, the model may include dynamic interference, latency, error rate, etc.

A traditional mobility or dynamic connectivity model as described above outputs a vector of locations for each time snapshot. That is, at a given time snapshot, it outputs the (lat,long) or (x,y) coordinate of each node in the model.

The present method takes this time-varying vector and converts it into a time varying matrix, one matrix for each time snapshot. In each (square) matrix, the rows and columns are the node identifiers, and the entry (r, c) denotes the path loss between the locations of the two nodes.

The path loss between two locations L1 and L2 is calculated as a function of the Euclidean distance between L1 and L2. There are several functions that are available to do this. As an example, the Free Space, Two-ray path loss or other models may be employed.

Therefore, according to the present invention, a mobility model may be used to control a time-varying path loss matrix over time, to emulate the environmental path of each node. The matrix may include not only attenuation, but also time delay and frequency-dependent effects, and perhaps Doppler shifts, as may be relevant to the circumstances of the network. For example, some systems analyze signals not only for modulation sequence, but also attenuation, timing, Doppler shift, multipath, frequency-dependent channel characteristics, and the like. Each of these may be simulated in a radio frequency signal control device, though emulation of a Doppler shift in a static environment may require a frequency controllable signal generation/regeneration device. The mobility trace may be converted using Free space model, Two-ray ground reflection model, probabilistic Shadowing Model, etc.

Ahmed, Shabbir Ahmed, and Salil Salil. "Characterization of a large-scale delay tolerant network." (2010): 56-63.

Baumann, Rainer, Franck Legendre, and Philipp Sommer. "Generic mobility simulation framework (GMSF)." In Proceedings of the 1st ACM SIGMOBILE workshop on Mobility models, pp. 49-56. ACM, 2008.

Eltahir, Ibrahim Khider. "The impact of different radio propagation models for mobile ad hoc networks (MANET) in urban area environment." In null, p. 30. IEEE, 2007.

Gray, Robert S., David Kotz, Calvin Newport, Nikita Dubrovsky, Aaron Fiske, Jason Liu, Christopher Masone, Susan McGrath, and Yougu Yuan. "Outdoor experimental comparison of four ad hoc routing algorithms." In Proceedings of the 7th ACM international symposium on Modeling, analysis and simulation of wireless and mobile systems, pp. 220-229. ACM, 2004.

Harri, Jerome, Fethi Filali, and Christian Bonnet. "Mobility models for vehicular ad hoc networks: a survey and taxonomy." IEEE Communications Surveys & Tutorials 11, no. 4 (2009).

Lee, Kevin C., Uichin Lee, and Mario Gerla. "Survey of routing protocols in vehicular ad hoc networks." In Advances in vehicular ad-hoc networks: Developments and challenges, pp. 149-170. IGI Global, 2010.

Liu, Jason, Yougu Yuan, David M. Nicol, Robert S. Gray, Calvin C. Newport, David Kotz, and Luiz Felipe Perrone. "Simulation validation using direct execution of wireless ad-hoc routing protocols." In Proceedings of the eighteenth workshop on Parallel and distributed simulation, pp. 7-16. ACM, 2004.

Mak, Tony K., Kenneth P. Laberteaux, and Raja Sengupta. "A multi-channel VANET providing concurrent safety and commercial services." In Proceedings of the 2nd ACM international workshop on Vehicular ad hoc networks, pp. 1-9. ACM, 2005.

Musolesi, Mirco, and Cecilia Mascolo. "A community based mobility model for ad hoc network research." In Proceedings of the 2nd international workshop on Multi-hop ad hoc networks: from theory to reality, pp. 31-38. ACM, 2006.

Musolesi, Mirco, and Cecilia Mascolo. "Designing mobility models based on social network theory." ACM SIGMOBILE Mobile Computing and Communications Review 11, no. 3 (2007): 59-70.

Naumov, Valery, Rainer Baumann, and Thomas Gross. "An evaluation of inter-vehicle ad hoc networks based on realistic vehicular traces." In Proceedings of the 7th ACM international symposium on Mobile ad hoc networking and computing, pp. 108-119. ACM, 2006.

Ranjan, Prabhakar, and Kamal Kant Ahirwar. "Comparative study of vanet and manet routing protocols." In Proc. of the International Conference on Advanced Computing and Communication Technologies (ACCT 2011), pp. 517-523. 2011.

Singh, Pranav Kumar, and Kapang Lego. "Comparative study of radio propagation and mobility models in vehicular adhoc network." International Journal of Computer Applications (0975-8887) 16, no. 8 (2011).

Sommer, Christoph, Reinhard German, and Falko Dressler. "Bidirectionally coupled network and road traffic simulation for improved IVC analysis." IEEE Transactions on Mobile Computing 10, no. 1 (2011): 3-15.

Sommer, Christoph, Zheng Yao, Reinhard German, and Falko Dressler. "Simulating the influence of IVC on road traffic using bidirectionally coupled simulators." In INFOCOM Workshops 2008, IEEE, pp. 1-6. IEEE, 2008.

Stanica, Razvan, Emmanuel Chaput, and André-Luc Beylot. "Simulation of vehicular ad-hoc networks: Challenges, review of tools and recommendations." Computer Networks 55, no. 14 (2011): 3179-3188.

In this scheme, the parameters of elements of the matrix are communicated to the distributed microcontrollers, which then physically implement the channel condition using their respective controlled radio frequency signal control device (s). If these change over time, a vector of representing the states and their transitions may be communicated, and the microcontrollers synchronized with a common source of consensus reference to synchronize the transitions. In a shared band, a collision may occur from an out-of-network device without a direct mode of communication to the network to be simulated, and therefore the model may inferentially and statistically model the likely behavior of this other network and its effect on, and interaction with, the network under test. For example, the simulation of this competing interfering network may be modelled within a respective node microcontroller, or externally to the microcontrollers, within a "master" microcontroller for the respective interference, or as a distributed task among the various microcontrollers. In some cases, one or more interfering networks may be physically modelled, but in others, the interference may be simulated or digitally emulated. The time varying matrices are sent from Computer A to Computer B either in real-time or after collecting all the matrices for the duration of the run.

The attenuation-controllable testbed consists of a set of wireless devices. Each wireless device is connected to an attenuator stack. An attenuator stack is a set of serially connected hardware attenuators. An example is the PE4312 attenuator from Peregrine Semiconductors, www.psemi-.com/pdf/datasheets/pe4312ds.pdf. Alternates include: Analog Devices ADRF57XX, HMC8073, HMC425A, HMC291S, HMC1019A, HMC1018A, HMC941, HMC939, HMC1119, HMC629A, HMC470A, HMC802A, HMC539A, HMC273A, HMC1122, HMC305S, HMC540S, HMC306A, HMC792A, HMC1095, HMC468A, HMC624A, HMC542B, HMC472A, ADRF6801, HMC759, HMC424; IDT PDFIMGF1912, PDFIMGF1950, PDFIMGF1951, PDFIMGF1953, PDFIMGF1956, PDFIMGF1958, PDFIMGF1975, PDFIMGF1977, PDFIMGF1978, PDFIMGF2250, PDFIMGF2255, PDFIMGF2258, PDFIMGF2270; Minicircuits DAT family, EVA family, ZFAT family. ZSAT-21R5+, ZX76 family, RC4DAT family, RUDAT family, ZVVA-3000, ZX73-2500+, TAOT family, etc. Therefore, any equivalent could be used. Each device is connected to the attenuator stack via a GPIOS (General Purpose Input Output) or other appropriate interface. An alternate manifestation is using WiFi or Bluetooth to connect between the devices and the attenuator stack, by configuring separate IP addresses for each attenuator.

An attenuator stack is provided between each pair of devices. Thus, if there are 6 devices, there would be 15 attenuator stacks. Each attenuator stack can be in aggregate set to a desired value to effect a particular path loss between the corresponding devices. To control the attenuation of the stack, a dedicated Computer may be employed, called Computers $C_{x,y}$. Thus, if there are 6 devices, there are 15 Computers. Each Computer is connected to each attenuator in the stack via three pins (so a total of 9).

A reasonably small and cheap computer can be used for this purpose. For example, a Raspberry Pi or Arduino controller may be used for each Computer $C_{x,y}$.

Figure 2:
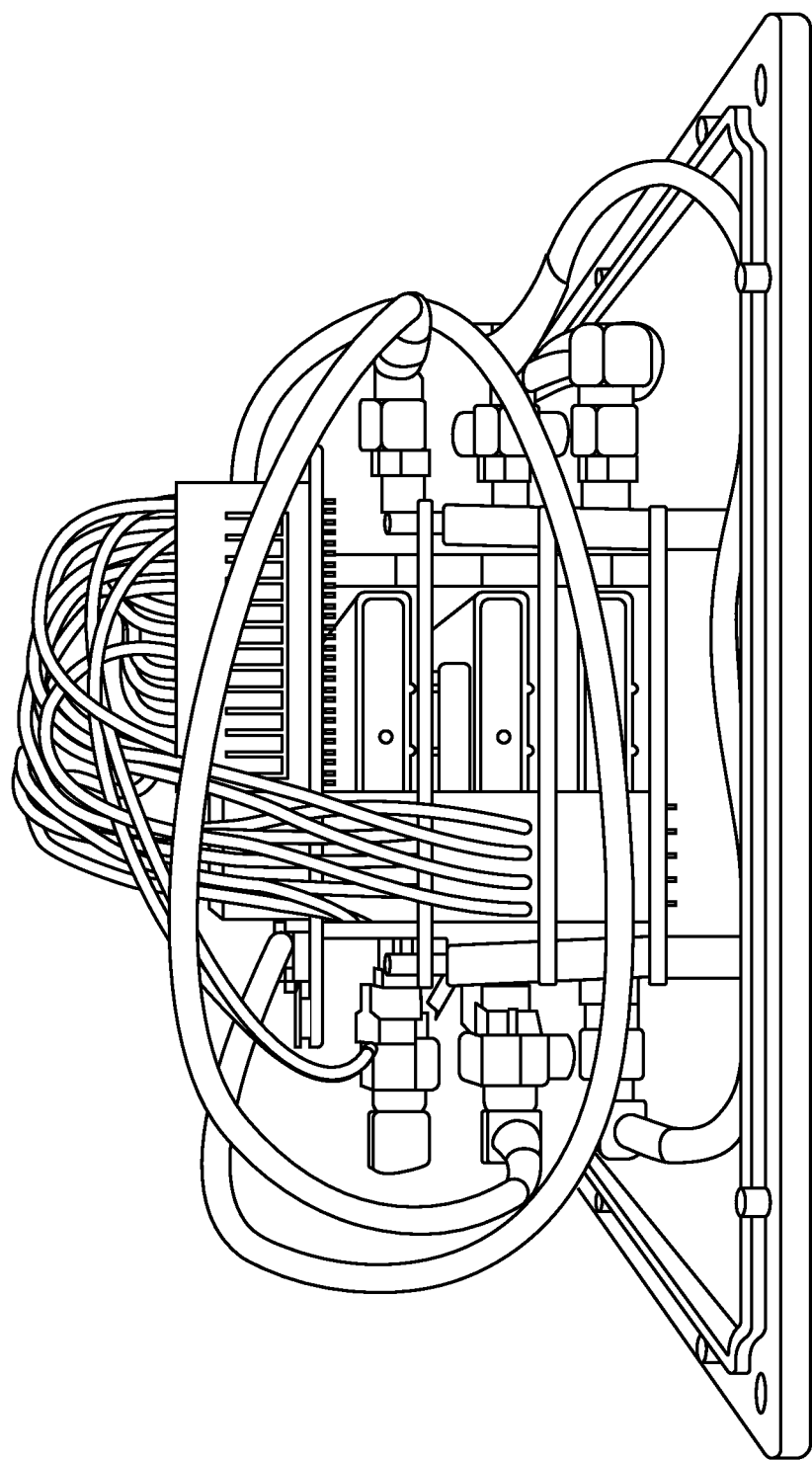
FIG. 2 shows an image of the three attenuators in the attenuator stack and the Raspberry Pi controller.

FIG. 2 shows a picture of an implementation using a Raspberry Pi connected to an attenuator stack using GPIOs.

The Computer B may be connected to each Computer $C_{x,y}$ over the Internet. After the Computer B receives a matrix from Computer A, it takes an entry $M_{r,c}$ where r is the row and c is the column number, and sends the value of that entry to Computer $C_{x,y}$ such that x=r and y=c. That is, for example, $M_{2,1}$ which represents the path loss P between node 1 and node 2 in the model, is sent to Computer $C_{1,2}$. We assume that the path-loss is symmetric, therefore $C_{1,2}=C_{2,1}$.

The receiving computer $C_{x,y}$ takes the value P and divides it up into values P1, P2 and P3 such that P1+P2+P3=P and sets attenuator 1 in the stack to P1, attenuator 2 in the stack to P2 and attenuator 3 in the stack to P3. Thus, the attenuation between devices x and y, controlled by Computer $C_{x,y}$ is set to P.

Thus, there is an end-to-end connection between the mobile network model in Computer A and the path loss between real devices on the stationary testbed. As the model executes in Computer A, the changing path loss between nodes as they move around is reflected in the attenuation between the corresponding devices by virtue of the path loss matrix entry being written in by Computers C. Such a connection and control can be effected in real-time if necessary, or by collecting the matrices up front and "replaying" it on Computer B at a convenient time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the foregoing description.

It should be noted that, one or more aspects of the various embodiments of the present disclosure may be included in an article of manufacture (e.g., one or more computer program products) having, for instance, computer usable media. The media has embodied therein, for instance, computer readable program code for providing and facilitating the capabilities of the various embodiments of the present disclosure. The article of manufacture can be included as a part of a computer system or sold separately.

Additionally, one or more aspects of the various embodiments of the present disclosure may be designed using computer readable program code for providing and/or facilitating the capabilities of the various embodiments or configurations of embodiments of the present disclosure.

Additionally, one or more aspects of the various embodiments of the present disclosure may use computer readable program code embodied on a non-transitory computer readable medium for providing and facilitating the capabilities of the various embodiments or configurations of embodiments of the present disclosure and that may be included as a part of a computer system and/or memory system and/or sold separately.

Additionally, at least one program storage device readable by a machine, tangibly embodying at least one program of instructions executable by the machine to perform the capabilities of the various embodiments of the present disclosure can be provided.

The diagrams depicted herein are just examples. There may be many variations to these diagrams or the steps (or operations) described therein without departing from the spirit of the various embodiments of the disclosure. For instance, the steps may be performed in a differing order, or steps may be added, deleted or modified.

In various optional embodiments, the features, capabilities, techniques, and/or technology, etc. of the memory and/or storage devices, networks, mobile devices, peripherals, hardware, and/or software, etc. disclosed in the following applications may or may not be incorporated into any of the embodiments disclosed herein.

References in this specification and/or references in specifications incorporated by reference to "one embodiment" may mean that particular aspects, architectures, functions, features, structures, characteristics, etc. of an embodiment that may be described in connection with the embodiment may be included in at least one implementation. Thus, references to "in one embodiment" may not necessarily refer to the same embodiment. The particular aspects, etc. may be included in forms other than the particular embodiment described and/or illustrated and all such forms may be encompassed within the scope and claims of the present application.

It may thus be seen from the examples provided above that the improvements to devices (e.g., as shown in the contexts of the figures included in this specification, for example) may be used in various applications, contexts, environments, etc. The applications, uses, etc. of these improvements, etc. may not be limited to those described above, but may be used, for example, in combination. For example, one or more applications, etc. used in the contexts, for example, in one or more figures may be used in combination with one or more applications, etc. used in the contexts of, for example, one or more other figures and/or one or more applications, etc. described in any specifications incorporated by reference. Further, while various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A radio frequency device, comprising:
a packet data interface port;
a radio frequency signal input port;
a modified radio frequency signal output port;
a microcontroller, configured to:
control the packet data interface port,
receive an input control signal through the packet data interface port,
transmit a status report through the packet data interface port, and
produce an output control signal in dependence on the input control signal; and
a radio frequency signal control device, configured to modify a radio frequency signal received through the radio frequency signal input port according to an analog radio frequency signal modification process, over a range of modification selectively controlled in dependence on the output control signal to vary a path loss over time and the path loss varies over time to emulate mobility according to at least one of a free space algorithm and a two-ray algorithm, and to communicate the modified radio frequency signal through the modified radio frequency signal output port.

2. The radio frequency device according to claim 1, wherein the packet data interface port comprises an IEEE 802 port and the microcontroller transmits the status report through the IEEE 802 port to a remote server.

3. The radio frequency device according to claim 1, wherein the radio frequency signal control device comprises at least one of a radio frequency attenuator, a radio frequency delay, a radio frequency noise source, a radio frequency filter, a radio frequency equalizer, and a radio frequency amplifier.

4. The radio frequency device according to claim 1, wherein the output control signal comprises an analog output signal.

5. The radio frequency device according to claim 1, further comprising a control processor, communicating through the packet data interface port with the microcontroller, the control processor being configured to: generate a plurality of the input control signals for a plurality of respective radio frequency devices; and coordinate the plurality of respective radio frequency devices to concurrently modify a plurality of radio frequency signals.

6. The radio frequency device according to claim 5, wherein the control processor is configured to control the plurality of respective radio frequency devices, to dynamically change the plurality of input control signals over time.

7. The radio frequency device according to claim 6, wherein the plurality of input control signals are dynamically changed over time to emulate radio frequency conditions resulting from mobility of nodes in a mobile ad hoc radio frequency communication network, wherein each radio frequency signal control device emulates a radio frequency path within the mobile ad hoc radio frequency communication network.

8. A method, comprising:
receiving an input control signal through a packet data interface port of a radio frequency device comprising a microcontroller having a packet data interface port;
transmitting a status report from the microcontroller through the associated packet data interface port;
producing an output control signal from the microcontroller in dependence on the input control signal;
modifying a received radio frequency signal with an analog radio frequency signal modification device, over a range of analog signal modification, selectively in dependence on the output control signal;
communicating through the packet data interface port between a remote control processor and the microcontroller, the remote control processor generating a plurality of the input control signals for a plurality of respective radio frequency devices comprising the microcontroller and the analog radio frequency signal modification device;
modelling mobility of a node in an ad hoc network comprising a plurality of nodes;
defining a path loss matrix selectively dependent on the modelled mobility of the plurality of nodes in the ad hoc network; and
said modifying the received radio frequency signal comprises emulating the modelled mobility of the plurality of nodes with respect to modifications of respective received radio frequency signals from a plurality of other nodes.

9. The method according to claim 8, wherein the packet data interface port comprises an IEEE 802 port, further comprising transmitting the status report through the IEEE 802 port to a remote server.

10. The method according to claim 8, wherein the radio frequency signal modification device comprises at least one of a radio frequency attenuator, a radio frequency delay, a radio frequency noise source, a radio frequency filter, a radio frequency equalizer, and a radio frequency amplifier.

11. The method according to claim 8, wherein the radio frequency signal control device comprises a radio frequency signal generator.

12. The method according to claim 8, wherein the radio frequency signal control device comprises a radio frequency switch matrix.

13. The method according to claim 8, wherein the output control signal comprises an analog output signal.

14. The method according to claim 8 wherein the control processor coordinates the plurality of respective radio frequency devices comprising the microcontroller and the analog radio frequency signal modification device to concurrently dynamically modify a plurality of radio frequency signals over time.

15. The method according to claim 8, further comprising dynamically changing the plurality of input control signals are over time to emulate radio frequency conditions resulting from mobility of nodes in a mobile ad hoc radio frequency communication network, wherein each radio frequency signal modification device emulates a radio frequency path within the mobile ad hoc radio frequency communication network.

16. A testing system, comprising:
a plurality of radio frequency devices, each respective radio frequency device comprising a packet data interface port,
a microcontroller configured to:
control the packet data interface port,
receive an input control signal through the packet data interface port,
transmit a status report through the packet data interface port, and
produce an output control signal in dependence on the input control signal, to control a radio frequency signal modification device for modification of a received radio frequency signal over an analog range of modification, selectively in dependence on the output control signal;
a control processor, communicating through the packet data interface port of each respective radio frequency device with the respective microcontroller of the respective radio frequency device, the control processor being configured to generate a plurality of the input control signals for the plurality of respective radio frequency devices; and
a mobility simulator, configured to generate a dynamically changing model of a multi-node communication network subject to changing communication channels, wherein the mobility simulator is configured to provide the dynamically changing model to the control processor;
wherein each respective radio frequency signal control device is controlled according to the respective input control signal to vary a path loss over time and the path loss varies over time to emulate mobility according to at least one of a free space algorithm and a two-ray algorithm.

17. A testing system, comprising:
a plurality of radio frequency devices, each respective radio frequency device comprising a packet data interface port,
a microcontroller configured to:
control the packet data interface port,
receive an input control signal through the packet data interface port,
transmit a status report through the packet data interface port, and
produce an output control signal in dependence on the input control signal, to control a radio frequency signal modification device for modification of a received radio frequency signal over an analog range of modification, selectively in dependence on the output control signal;
a control processor, communicating through the packet data interface port of each respective radio frequency device with the respective microcontroller of the respective radio frequency device, the control processor being configured to generate a plurality of the input control signals for the plurality of respective radio frequency devices; and
a mobility simulator, configured to generate a dynamically changing model of a multi-node communication network subject to changing communication channels, wherein the mobility simulator is configured to provide the dynamically changing model to the control processor;

wherein the mobility simulator is configured to generate a matrix representing mobility model-consistent changes of the modification of the received radio frequency signals by the plurality of radio frequency devices, and the input control signals generated by the control processor comprise cell values of the matrix, sent to respective radio frequency devices.

* * * * *